US012794577B2

(12) United States Patent
Paccard et al.

(10) Patent No.: US 12,794,577 B2
(45) Date of Patent: Nov. 10, 2026

(54) VIDEO PROCESSING APPARATUS WITH NOISE EFFECT MITIGATION

(71) Applicant: AMBU A/S, Ballerup (DK)

(72) Inventors: Jean-François Jacques André Paccard, Vanløse (DK); Sten Carlsen, Sengeløse (DK); Jörgen Reinhold Olsson, Lomma (SE); Tobias Michael Østergren, København N (DK)

(73) Assignee: AMBU A/S, Ballerup (DK)

( * ) Notice: Subject to any disclaimer, the term of this patent is extended or adjusted under 35 U.S.C. 154(b) by 206 days.

(21) Appl. No.: 18/570,386

(22) PCT Filed: Jun. 29, 2022

(86) PCT No.: PCT/EP2022/067962
§ 371 (c)(1),
(2) Date: Dec. 14, 2023

(87) PCT Pub. No.: WO2023/275177
PCT Pub. Date: Jan. 5, 2023

(65) Prior Publication Data

US 2024/0275510 A1 Aug. 15, 2024

(30) Foreign Application Priority Data

Jun. 30, 2021 (DE) ..................... 10 2021 116 905.4
Jun. 30, 2021 (DE) ..................... 10 2021 116 927.5

(51) Int. Cl.
*H04B 17/309* (2015.01)
*H04B 17/23* (2015.01)

(52) U.S. Cl.
CPC .......... *H04B 17/346* (2023.05); *H04B 17/23* (2015.01)

(58) Field of Classification Search
CPC .............. H04B 17/346; A61B 1/00018; A61B 18/1492; A61B 2018/1293; A61B 1/000095; A61B 2018/00982
See application file for complete search history.

(56) References Cited

U.S. PATENT DOCUMENTS 3,825,854 A * 7/1974 Pichal .................. H03F 1/3217 330/69
3,895,344 A * 7/1975 Gill, Jr .................... G08G 1/01 367/136

(Continued)

FOREIGN PATENT DOCUMENTS

EP 0566861 B1 6/1998
EP 2575353 A1 4/2013

(Continued)

OTHER PUBLICATIONS

German Search Report received for DE Application 10 2021 116 927.5, 14 pages (7 pages of English Translation and 7 pages of Original Document).

(Continued)

*Primary Examiner* — Anhtuan T Nguyen
*Assistant Examiner* — Jae Woo
(74) *Attorney, Agent, or Firm* — Faegre Drinker Biddle & Reath LLP

(57) ABSTRACT

A visualization system including an endoscope, a display unit and a communication bus. The endoscope includes: an insertion cord and a handle or interface including a handle or interface housing and a handle or interface printed circuit board, the insertion cord extending from the handle or interface and including an insertion tube, a bending section and a distal tip unit including a camera module including an image sensor and an image sensor circuitry; the display unit including an input circuitry; and the communication bus configured to enable a communication between the image (Continued)

sensor circuitry, the handle or interface printed circuit board and the input circuitry; wherein the input circuitry of the display unit is configured to check for a high frequency noise and electrical disturbance on the communication bus.

19 Claims, 10 Drawing Sheets

(56) References Cited

U.S. PATENT DOCUMENTS

| | | | | |
|---|---|---|---|---|
| 3,976,893 | A * | 8/1976 | Banfi | G05B 19/048 327/392 |
| 4,240,111 | A * | 12/1980 | Meise | H04N 5/08 348/529 |
| 4,344,187 | A * | 8/1982 | Ogita | H03J 7/065 455/194.1 |
| 4,365,349 | A * | 12/1982 | Ogita | H03J 1/005 455/212 |
| 4,614,971 | A * | 9/1986 | Maney | H04N 7/0882 348/478 |
| 4,926,701 | A | 5/1990 | Tompkins | |
| 4,962,508 | A * | 10/1990 | Kingston | H04K 3/228 375/148 |
| 4,969,160 | A * | 11/1990 | Kingston | H04K 3/228 375/364 |
| 5,031,036 | A * | 7/1991 | Kikuchi | A61B 1/0005 348/E5.064 |
| 5,035,150 | A | 7/1991 | Tompkins | |
| 5,402,769 | A | 4/1995 | Tsuji | |
| 5,569,158 | A * | 10/1996 | Suzuki | A61B 1/05 600/110 |
| 6,142,992 | A * | 11/2000 | Cheng | A61B 18/148 606/41 |
| 6,348,035 | B1 | 2/2002 | Takami | |
| 6,353,341 | B1 * | 3/2002 | Lesea | G01R 31/31922 327/205 |
| 8,961,505 | B2 | 2/2015 | Riff | |
| 10,874,283 | B2 | 12/2020 | Dresher | |
| 2005/0113046 | A1 * | 5/2005 | Liu | H03G 3/3052 455/135 |
| 2007/0139521 | A1 * | 6/2007 | Takahashi | A61B 1/00006 348/E5.043 |
| 2007/0237471 | A1 * | 10/2007 | Aronson | G02B 6/4292 385/100 |
| 2008/0051634 | A1 * | 2/2008 | Yamashita | A61B 1/00071 600/153 |
| 2010/0049188 | A1 * | 2/2010 | Nelson | A61B 34/25 606/34 |
| 2010/0194290 | A1 * | 8/2010 | Hanano | A61B 1/0655 315/152 |
| 2011/0060329 | A1 * | 3/2011 | Gilbert | A61B 18/1206 606/34 |
| 2011/0208000 | A1 * | 8/2011 | Honda | A61B 1/0016 600/118 |
| 2011/0298908 | A1 * | 12/2011 | Murakami | A61B 1/000095 348/E7.085 |
| 2012/0065509 | A1 * | 3/2012 | Ziv-Ari | G01S 7/52077 600/443 |
| 2012/0201325 | A1 * | 8/2012 | Perthold | H04B 17/23 375/295 |
| 2013/0176409 | A1 | 7/2013 | Kotani et al. | |
| 2014/0102219 | A1 * | 4/2014 | Kuwahara | B62D 5/0481 73/862.333 |
| 2014/0371527 | A1 * | 12/2014 | Sato | A61B 1/00055 600/106 |
| 2015/0126990 | A1 * | 5/2015 | Sharma | A61B 17/3415 606/30 |
| 2015/0208942 | A1 * | 7/2015 | Bar-Tal | A61B 5/361 600/509 |
| 2015/0306340 | A1 * | 10/2015 | Giap | G16H 20/40 600/301 |
| 2015/0342443 | A1 * | 12/2015 | Tanabe | G02B 23/2484 600/109 |
| 2016/0261316 | A1 * | 9/2016 | Bai | H04B 7/0413 |
| 2017/0168286 | A1 * | 6/2017 | Mori | G02B 23/2469 |
| 2017/0238786 | A1 | 8/2017 | Dresher | |
| 2018/0048790 | A1 * | 2/2018 | Adachi | H04N 25/7795 |
| 2019/0200844 | A1 | 7/2019 | Shelton, IV et al. | |
| 2019/0200987 | A1 | 7/2019 | Shelton, IV et al. | |
| 2019/0246924 | A1 * | 8/2019 | Vollmer | A61B 18/1206 |
| 2020/0026059 | A1 * | 1/2020 | Tachikawa | H04N 23/66 |
| 2020/0138266 | A1 * | 5/2020 | Suzuki | G02B 23/2484 |
| 2020/0154986 | A1 * | 5/2020 | Shimoyama | A61B 1/00158 |
| 2020/0336339 | A1 * | 10/2020 | Nissilä | H04L 25/0204 |
| 2021/0145503 | A1 * | 5/2021 | Paré | A61B 18/1206 |
| 2021/0313999 | A1 * | 10/2021 | Atriss | H03M 1/802 |
| 2022/0211253 | A1 * | 7/2022 | Kato | A61B 1/045 |
| 2022/0311911 | A1 * | 9/2022 | Kobayashi | H04N 23/81 |

FOREIGN PATENT DOCUMENTS

| | | | |
|---|---|---|---|
| EP | 2911569 | B1 | 1/2020 |
| WO | 2021/124546 | A1 | 6/2021 |

OTHER PUBLICATIONS

German Search Report received for DE Application No. 10 2021 116 905.4, mailed on Mar. 21, 2022, 14 pages (7 pages of English Translation and 7 pages of Original Document).

International Search Report and Written Opinion received for PCT Patent Application No. PCT/EP2022/067962, mailed on Dec. 13, 2022, 15 pages.

* cited by examiner

VIDEO PROCESSING APPARATUS WITH NOISE EFFECT MITIGATION

CROSS-REFERENCE TO RELATED APPLICATIONS

This application is a National Stage entry under 35 U.S.C. § 371 of International Application No. PCT/EP2022/067962, filed Jun. 29, 2022, which claims priority from and the benefit of German Patent Applications Nos. DE 10 2021 116 905.4 and DE 10 2021 116 927.5, filed Jun. 30, 2021; the contents of the aforementioned applications are incorporated herein by reference in their entirety.

TECHNICAL FIELD

The disclosure relates to a video processing apparatus operable to mitigate the effect of signal noise in an endoscope communicatively connected with the video processing apparatus. The disclosure also relates to an endoscope with a sensor operable to detect signal noise.

BACKGROUND OF THE DISCLOSURE

Endoscopes generally, and procedure-specialized endoscopes in particular, such as bronchoscopes, arthroscopes, colonoscopes, laparoscopes, gastroscopes and duodenoscopes, are well known from the state of the art and are used at least for visual examination and diagnosis of hollow organs and body cavities, as well as, optionally, to assist in surgery, e.g. for a targeted tissue sampling. Both reusable and disposable endoscopes are known from the state of the art. Basically, an insertion cord comprising an insertion tube, a (distal) bending section and a (distal) tip unit extending in this order from a proximal endoscope handle can be inserted into a hollow organ or body cavity to be investigated with the endoscope. The tip unit includes a camera module provided to convert optical images into image data which is communicated to a video processing apparatus for presentation with a display connected to the video processing apparatus.

Known endoscopes usually comprise an internal working channel provided inside the insertion cord that extends from the endoscope handle towards the distal tip unit and has an opening at the distal end of the distal tip unit. The working channel is usually accessible via an access port provided in the endoscope handle. A surgical instrument may be guided through the working channel into the patient's body cavity (i.e., distally with respect to the tip of the endoscope) via the access port. An operator may perform medical procedures within the patient's body cavity with the surgical instrument. It is in this context already known to use electrosurgical tools in endoscopic procedures, i.e., to insert electrosurgical tools via the access port and the working channel into the patient's body cavity. Additionally, the working channel can also be used as a suction channel to aspirate, for example, body fluid from an operation area within a patient's body.

Known electrosurgical tools, which are operated by high voltage pulses (e.g. in a range of 4 kV to 5 kV), may generate high frequency noise and electrical disturbance. An electrosurgical tool, which is configured to perform argon plasma coagulation (APC), is an example of such electrosurgical tools. Argon plasma coagulation is an electrosurgical, monopolar procedure for superficial hemostasis, devitalization and ablation using ionized argon gas, which as an inert gas can be easily ionized. High voltage pulses result in a strong electric field (high frequency) that may be experienced as a high frequency noise and electrical disturbance on cables located near the electrosurgical tool. The cables, or wires, are provided in the endoscope for communicating images from the camera module to the video processing apparatus and for communicating commands, or configuration parameters, from the video processing apparatus to the camera module. The high frequency noises and electrical disturbances may be present along the entire working channel.

It is known to use such electrosurgical tools in combination with well-known reusable endoscopes. In reusable endoscopes, many components are made of metal parts and the cables for communicating images from the distal tip to the handle, which cables are provided within the insertion cord of the endoscope, may be shielded, such that reusable endoscopes provide a good shielding against high frequency noises and electrical disturbances that may arise from the use of such electrosurgical tools.

For single-use endoscopes, it is important that the entire endoscope can be manufactured economically and inexpensively. Therefore, parts/components of single-use endoscopes are mainly made of polymeric materials to enhance disposability, reduce the size, e.g. cross-section, of the insertion cord, and reduce costs. The working channel is usually formed as a flexible polymer tube in single-use endoscopes. Further, for single-use endoscopes it is desirable to use unshielded cables, which are less expensive than shielded cables. Therefore, single-use endoscopes usually do not provide good shielding against high frequency noises and electrical disturbances when an electrosurgical tool is inserted and operated in the working channel. Nevertheless, single-use endoscopes should also be suitable for use with electrosurgical tools. Accordingly, the communications between the video processing apparatus and the camera module should be protected to minimize the effect of signal noise caused by the use of electrosurgical tools.

More concretely, at the distal tip unit of (both single-use and reusable) endoscopes there is an image capturing means, such as a camera module, comprising an image sensor and image sensor circuitry. An image captured by the image sensor can be shown on a monitor/display screen communicatively connected to the endoscope. As described below, a video processing apparatus may include the display, in which case it may be referred to as a "display unit," or be communicatively connected to the display. The video processing apparatus may further comprise an image processing device like a CPU or a FPGA, which can communicate with the image sensor via a communication bus. In particular, images captured by the image sensor may be transferred via the communication bus to the image processing device, where they are processed. Moreover, settings may be transferred from the image processing device via the communication bus to the camera module provided in the distal tip. For single-use endoscopes, it usually applies that the cables for said communication bus, or communication bus wires, are not shielded. It is not excluded, however, that the communication bus may be shielded.

When a high-frequency electrosurgical tool (such as an electrosurgical tool configured to perform argon plasma coagulation) is inserted in the working channel of an endoscope and operated by the operator, the high frequency voltage of the high-frequency electrosurgical tool can generate noise in the communication bus. The noise can cause wrong bit insertion, e.g. at a wrong place in a register of the camera module or with a wrong value, and bits missing of the data transmitted during the data transmission via the communication bus, as the communication bus may be arranged quite close to the working channel and thus to the electrical high frequency noise source (the electrosurgical tool). The high frequency noise may result in flickering and frozen images being displayed with the display screen. The problem may be exacerbated in single-use endoscopes and, in particular, when the communication bus cable is unshielded. Further, it applies that when a high frequency noise occurs in a setting signal, especially in a register address, the data is likely to be written in an unknown address, namely in an unexpected random location and this may lead to an interruption of a normal operation, and a full reset of the entire system may be needed to resume correct operation. Thus, the high frequency noises may drastically affect the endoscopic operation performance and it may lead to the operator becoming unable to perform the endoscopic procedure as intended. The term "cable" as used herein refers to the wires used to establish the communication bus. In a serial communication bus the cable may comprise one, two, or more wires, for example a wire for a data line and a wire for a clock line. Additional wires are provided in the endoscope to supply power and a ground to the camera module and the illumination devices. In a parallel communication bus the cable comprises a plurality of wires, for example four or more, based on the data width of the bus.

To sum up, when a high frequency electrosurgical tool is used with a single-use endoscope, the communication bus between the endoscope and the video processing apparatus is quite susceptible to high frequency noise arising from the use of such electrosurgical tool. There is in particular the danger of losing live images for various reasons, including "freezing" of the camera module (requiring a reset) and because the communications on the communication bus go wrong, i.e. data is written in wrong places, or the wrong data is written, in the registers of the camera module in the distal tip.

BRIEF DESCRIPTION OF THE DISCLOSURE

The tasks and objectives of the present disclosure are to eliminate or at least to reduce the disadvantages of the prior art and to suitably deal with the above-described situation. In particular, flickering and frozen images on a display screen connected to an endoscope due to high frequency noise and electrical disturbance, as well as interruption of normal operation/system failure shall be prevented.

The tasks and objectives of the present disclosure are solved by a visualization (endoscopic) system in accordance with claim 1, by a method in accordance with claim 17, and by an endoscope in accordance with claim 18. Advantageous embodiments are claimed in the dependent claims and/or are explained below.

In the present disclosure, "distal" means in a direction away from an operator, preferably towards a patient and "proximal" means in a direction towards the operator, preferably away from the patient.

The present disclosure relates to a (endoscopic) system comprising: an endoscope or endoscope unit, a display or display unit and a communication bus, preferably a serial communication bus; the endoscope comprising: a proximal endoscope handle or (robotic) interface (as defined above) comprising a handle/interface housing and a handle/interface printed circuit board accommodated inside the handle/interface housing; and an insertion cord (endoscope shaft) extending from the endoscope handle/interface and comprising an insertion tube, a (actively actuateable) bending section and a distal tip unit (endoscope head), wherein the distal tip unit comprises a camera module comprising an image sensor configured to capture images and an image sensor circuitry configured to communicate with the display unit via the communication bus; the display unit comprising an input circuitry (comprising in particular a logic circuitry) configured to communicate with the handle/interface printed circuit board and with the image sensor circuitry via the communication bus; and the communication bus connecting the endoscope and the display unit and configured to enable a communication between the image sensor circuitry, the handle/interface printed circuit board and the input circuitry; wherein the display unit/the input circuitry of the display unit is configured to, preferably continuously or pulsatively, check for a high frequency noise and electrical disturbance on the communication bus.

Moreover, the present disclosure relates to a display unit comprising an input circuitry configured to, preferably continuously or pulsatively, check for a high frequency noise and electrical disturbance on a communication bus, via which the display unit is connectable to an endoscope/endoscope unit and which enables a communication between the input circuitry and the endoscope.

Further, the present disclosure relates to a method of, preferably continuously or pulsatively, checking for a high frequency noise and electrical disturbance on a communication bus, via which a display unit is connectable to an endoscope/endoscope unit and which enables a communication between the display unit and the endoscope.

According to the present disclosure, a (separate) display unit is provided which is especially adapted to prevent that electrical high frequency noises and disturbances, which may arise when, for example, an electrosurgical tool is used within a working channel of an endoscope, affect a communication bus configured to provide a communication between the endoscope and the display unit. The present disclosure takes into account that a flickering and frozen images on a screen connected to the endoscope or in the worst case, a system failure may immediately/directly occur when high frequency noises and electrical disturbances occur in the endoscope. Therefore, the display unit of the present disclosure, in particular the input circuitry of the display unit, is configured to preferably continuously (i.e. ongoing/non-stop) check whether a high frequency noise and electrical disturbance is present on the communication bus.

In case/if it is determined by the input circuitry of the display unit that there is a high frequency noise and electrical disturbance on the communication bus, which is in particular suitable (with respect to its quality and/or quantity) for affecting the communication bus/a communication via the communication bus, the input circuitry may be configured to (temporarily) terminate the communication via the communication bus.

The input circuitry may be configured to terminate the communication via/over the communication bus at least for a certain, preferably predetermined period of time in case of a high frequency noise and electrical disturbance on the communication bus.

By terminating the communication via the communication bus for a certain period of time immediately when a high frequency noise and electrical disturbance suitable for affecting the communication bus is present in the endoscope, it is preferably avoided that the communication via the communication bus enters a faulty state, in which e.g. images cannot be processed by an image processing device provided in the display unit and thus cannot be displayed on a display.

Preferably, the communication bus is a serial communication bus like an $I^2C$ bus or a SCCB (Serial camera control bus).

The endoscope may comprise a working channel configured for insertion of an electrosurgical tool (i.e. an electrosurgical tool can be inserted into the working channel). The working channel may extend inside the endoscope handle and/or inside the insertion cord, in particular from a working channel access port preferably provided in the endoscope handle to the distal tip unit. In particular, the working channel is formed by a connector part (Y-connector) comprising the working channel access port, by a (flexible) working channel tube within the insertion cord and by a tip housing of the distal tip unit. The connector part and the working channel tube are usually made of polymer/resin/plastic material. Preferably, the communication via the communication bus is terminated if a high frequency noise and electrical disturbance of a specific quality and/or quantity is present in the working channel.

A preferred embodiment is characterized in that the endoscope comprises a detector circuit/protection circuit/noise detection circuit configured to detect the high frequency noise and electrical disturbance, especially arising from a use and an operation of an electrosurgical tool, in the working channel. I.e. preferably, the endoscope itself is configured to detect the presence of high frequency noises and electrical disturbances. Advantageously, high frequency noises and electrical disturbances are detected directly and immediately where they occur, i.e. in the endoscope. The detector circuit/protection circuit may be configured to constantly or pulsatively look for high frequency noises and electrical disturbances that may affect the communication bus and may be incorporated/implemented at least partly in the handle/interface printed circuit board.

The detector circuit/protection circuit may be configured to provide an output signal indicating the presence of the high frequency noise and electrical disturbance on the communication bus, especially in case the high frequency noise and electrical disturbance achieves a specific quality and/or quantity. Especially preferred, the output signal may be transmitted to the input circuitry of the display unit. If the protection circuit/detector circuit detects such a high frequency noise and electrical disturbance and the input circuitry receives the output signal, the communication via the communication bus is preferably stopped by the display unit (its input circuitry).

It is to be understood that the output signal may be directly transmitted to the display unit or may be indirectly transmitted to the display unit. E.g. the output signal may also be a trigger signal which may pull down a connected line/communication line, e.g. a clock line, in the communication bus, which transmits the captured images from the image sensor to the display unit. To be said differently and more generally, the handle/interface printed circuit board (in which the detector circuit is preferably at least partly integrated) may be configured to pull down an already existing bus (e.g. the communication bus transmitting the captured images from the image sensor to the display unit) in order to provide a signal to the display unit indicating that a high frequency noise and electrical disturbance, preferably of a specific quality and/or quantity, is present in the endoscope. Therefore, advantageously no additional wire is needed between the handle/interface printed circuit board and the display unit.

Preferably, the communication between the input circuitry, the handle/interface printed circuit board and the image sensor circuitry is based on master-slave, wherein the input circuitry is the master and the handle/interface printed circuit board and the image sensor circuitry are slaves. This may be in particular advantageous in an alternative embodiment, in which no detector circuit is provided in the endoscope.

According to said alternative embodiment, the input circuitry may be configured to initially set a communication line output signal of a communication line of the communication bus, and to compare the communication line output signal with a communication line input signal of the communication line received from the handle/interface printed circuit board, to determine a presence of the high frequency noise and electrical disturbance (of specific quality and/or quantity) on the communication bus.

Especially preferred, the communication line output signal is an output clock signal of a clock line of the communication bus and the communication line input signal is an input clock signal of the clock line of the communication bus, and the input circuitry is configured to initially set the output clock signal, and to compare the output clock signal with the input clock signal received from the handle/interface printed circuit board, to determine the presence of the high frequency noise and electrical disturbance on the communication bus.

Moreover, the input circuitry may be configured to generate a comparison signal based on a comparison of the communication line output signal and the communication line input signal, and to determine the presence of the high frequency noise and electrical disturbance in case the comparison signal exceeds a predetermined threshold.

To sum up, according to the alternative embodiment, a logic circuitry of the input circuitry may be configured to compare an output of a communication line, in particular clock line, of the communication bus on the input circuitry with an input of the communication line, in particular clock line, of the communication bus from the (handle/interface) printed circuit board. By comparing the output of the communication line of the communication bus on the input circuitry with the input of the communication line of the communication bus from the (handle/interface) printed circuit board, it can be determined whether the high frequency noise and electrical disturbance is present on the communication bus without having to provide the detector circuit. The communication bus between the display unit, the handle/interface PCB and the camera module in the distal tip unit is preferably based on master/slave. The input circuitry provided in the display unit may be the master and may pull down or raise a communication line on the communication bus. If the communication line for instance is pulled down to low by the display unit, but is suddenly in an unexpected high state, the display unit may consider it as a presence of the high frequency noise and electrical disturbance on the communication bus. A comparison signal indicative of the result of the comparison may by generated by the display unit. The high frequency noise and electrical disturbance may be considered to be present in the endoscope in case the comparison signal exceeds a predetermined threshold value.

The display unit is thus preferably configured to preferably continuously check whether a noise detection signal (output signal of the detector circuit or comparison signal of the input circuitry) is received which indicates the presence of a high frequency noise and electrical disturbance preferably of a specific quality and/or quantity on the communication bus. When such a noise detection signal is received, the display unit, in particular the input circuitry, preferably performs a (termination) algorithm/method configured to terminate/stop the communication between the display unit and the endoscope via the communication bus.

According to a preferred embodiment, the logic (included in the input circuitry of the display unit) comprises a Field Programmable Gate Array (FPGA), and the algorithm/method of the present disclosure is implemented on the Field Programmable Gate Array. Said differently, it may be practical to implement the algorithm/method on such a Field Programmable Gate Array forming part of the logic (circuitry) of the input circuitry provided in the display unit. Advantageously a Field Programmable Gate Array may be easily updated and programmed to perform the algorithm of the present disclosure.

According to an especially preferred embodiment the algorithm/method of the present disclosure comprises the following steps (i.e. the display unit is configured to perform the following steps):

a) determine whether a noise detection signal is received;
b) block the communication bus in case the noise detection signal is received.
c) look for a further noise detection signal for a first predetermined time period;
d) in case no further noise detection signal is received in step c), restart an operation of the communication bus;
e) in case a further noise detection signal is received in step c), wait until no noise detection signal is received for the first predetermined time period, i.e. until an end of a burst of pluses emitted by an electrosurgical tool is reached.
f) at the end of the burst of pluses, wait for a second predetermined time period and determine whether there is a further burst of pulses detected during the second predetermined time period;
g) in case no further burst of pulses is detected in step f), restart the operation of the communication bus; and
h) in case a further burst of pulses is detected in step f), repeat step e) until no further burst of pulses is detected in step f).

Speaking more generally, the algorithm/method according to the present disclosure particularly considers the nature of electrosurgical units/electrosurgical tools used for endoscopic procedures. In particular, an electrosurgical tool configured to perform argon plasma coagulation (APC) may be a specific example of such an electrosurgical tool. It has been found according to the present disclosure that when controlling/powering such an electrosurgical tool, specific noise signals are emitted. In particular, it has appeared that such electrosurgical tools periodically emit bursts of pulses, both in a fast pulse mode and in a slow pulse mode. A burst of pulses usually comprises a plurality of individual pulses, which may cause a disturbance of the communication bus, leading to a transmission of wrong data to wrong addresses.

Advantageously, the display unit according to above steps a) and b) is configured to immediately stop/block the communication on the communication bus in case a noise detection signal/an individual pulse is received, in order to prevent that an individual pulse causes a disturbance of the communication bus.

Moreover, the display unit according to above steps c), d) and e) advantageously is configured to check whether the received noise detection signal is random noise (this is the case if no further noise is received during the first predetermined time period, cf. steps c) and d)) or whether the received noise detection signal is part of a burst of pulses (this is the case if further noise is received during the first predetermined time period, cf. steps c) and e)). In case the noise detection signal is random noise, the operation of the communication bus may be restarted/continued. Only in case the noise detection signal is part of a burst of pulses the operation of the communication bus is continued to be blocked.

The first predetermined time period is preferably set in dependence on a distance between two individual pulses of a burst of pulses. It has been found e.g. that two individual pulses of a burst of pulses are usually spaced in microsecond range. In this light, the first predetermined time period may be set such that it is sufficiently longer than the distance of two individual pulses. Preferably, the first predetermined time period may be set in the single-digit millisecond range (e.g. between 1 ms and 10 ms). Especially preferred the first predetermined time period is set to be 1 ms according to the present disclosure. Setting the first predetermined time in this way makes it possible that a burst of pulses suitable to disturb the communication via the communication bus is reliably detected.

According to above step e) the display unit is preferably configured to wait until no further noise detection signal has been received for the first predetermined time period in case a burst of pulses has been detected. The display unit is thus preferably configured to determine whether or not an end of a burst of pulses has been reached.

By waiting a second predetermined time period in accordance with step f) it can be determined whether a first detected burst of pulses is part of a pulsed operation of the electrosurgical tool and whether a distance between two bursts of pulses is too small in order to restart operation of the communication bus in between two bursts of pulses. In particular, in a fast pulse mode of the electrosurgical tool it is preferable to not start the operation of the communication bus between two bursts of pulses.

It has been found that the second predetermined time period is preferably set in a millisecond range, in particular between 100 ms and 200 ms, e.g. 125 ms. This makes it possible that another burst of pulses in the fast pulse mode of the electrosurgical tool would be detected, so that it can be prevented that the operation of the communication bus is restarted in the fast pulse mode.

Preferably, in case a further burst of pulses/further bursts of pulses are detected in the second predetermined time period, the display unit is configured to wait until no further burst of pulses is detected for/during the second predetermined time period. The display unit therefore preferably ensures that the communication bus is only restarted in case a fast pulse mode of the electrosurgical tool has ended.

Generalized it can be said that the second predetermined time period is preferably longer than the first predetermined time period.

Further, it can be said that the display unit is configured to stop the communication/operation of the communication bus for a first short predetermined time period only in case of random noise and to stop the communication of the communication bus for a time period longer than the first predetermined time period in case of a burst of pluses resulting from the operation of an electrosurgical tool.

Moreover, it is evident that the system according to the present disclosure may comprise an electrosurgical tool configured to be inserted into the working channel of the (single-use) endoscope and operated by the operator. During the operation of the electrosurgical tool, it generally emits an electrical high frequency noise comprising a burst of pulses with a wide range of frequencies. The display unit of the present disclosure is in particular specifically prepared for said situation (electrosurgical tool inserted in working channel of single-use endoscope).

The display unit may comprise a display/screen/monitor. Alternatively, the display/screen/monitor may be in electrical communication with the display unit and formed/configured as a part/component separate from the display unit.

The present disclosure makes it possible that the live image shown on the display/screen/monitor during an electrosurgical operation stays during the procedure, with acceptably low level of flickering. The solution in accordance with the present disclosure is highly compatible with single-use endoscopes where plastic materials are widely used. Moreover, the present disclosure may be easily implemented by a code update of a Field Programmable Gate Array of the display unit. Preferably, no hardware changes of the endoscope are needed. Advantageously the communication bus is protected against a wide range of high frequency noises and electrical disturbances.

The present disclosure may also relate to the following aspects, wherein each aspect of the following aspects may be independently and arbitrarily combined with any one of the above mentioned aspects and the claims.

1. Endoscope comprising: a proximal endoscope handle or interface comprising a handle or interface housing, a working channel access port and a printed circuit board, wherein the printed circuit board is accommodated inside the handle or interface housing; an insertion cord extending from the proximal endoscope handle or interface and comprising an insertion tube, a bending section and a distal tip unit, wherein the distal tip unit comprises a camera module connected with the printed circuit board; a working channel extending from the working channel access port of the endoscope handle or interface to the distal tip unit of the insertion cord; and a detector circuit configured to detect a presence of a high frequency noise and electrical disturbance arising from a use and an operation of an electrosurgical tool in the working channel.
2. Endoscope according to aspect 1, wherein the detector circuit comprises: a sensor part configured to detect the presence of the high frequency noise and electrical disturbance, and a circuit part electrically connected with the sensor part and configured to provide an output signal indicating the presence of the high frequency noise and electrical disturbance.
3. Endoscope according to aspect 2, wherein the sensor part is configured to input a voltage to the circuit part, and the circuit part is configured to output the output signal based on the voltage input to the circuit part from the sensor part.
4. Endoscope according to aspect 3, wherein the circuit part is configured to set an upper threshold voltage and a lower threshold voltage, and the output signal of the circuit part is changed when the voltage transmitted from the sensor part is above the upper threshold voltage or below the lower threshold voltage.
5. Endoscope according to any one of aspects 2 to 4, wherein the circuit part is integrated in the printed circuit board provided in the endoscope handle or interface.
6. Endoscope according to any one of aspects 2 to 5, wherein the circuit part comprises a window comparator.
7. Endoscope according to any one of aspects 2 to 6, wherein the sensor part is positioned around the working channel so as to at least partly surround the working channel.
8. Endoscope according to any one of aspects 2 to 7, wherein the working channel is formed by a connector part comprising the access port, by a working channel tube and by a tip housing of the distal tip unit, and the sensor part is positioned on an outer surface of the connector part or on an outer surface of the working channel tube.
9. Endoscope according to any one of aspects 2 to 8, wherein the sensor part is an electrically conductive part and is configured so as to function as a capacitor.
10. Endoscope according to any one of aspects 2 to 9, wherein the sensor part is formed as an electrically conductive foil or tape or as a flexible printed circuit board, so as to be able to be bent and shaped in order to follow an outer contour of the working channel.
11. Endoscope according to any one of aspects 2 to 10, wherein the sensor part is arranged inside the proximal endoscope handle or interface.
12. System comprising: an endoscope according to any one of the preceding aspects 1 to 11; and a display unit being connected with the printed circuit board accommodated in the handle or interface housing of the endoscope handle or interface, being configured to communicate with the camera module provided in the distal tip unit of the insertion cord via a communication bus, and being configured to terminate a communication via the communication bus when the detector circuit detects the presence of the high frequency noise and electrical disturbance.
13. System according to aspect 12, wherein the display unit comprises an input circuitry comprising a logic circuitry for communicating with the printed circuit board accommodated in the handle or interface housing of the endoscope handle or interface and with the camera module provided in the distal tip unit of the endoscope, the input circuitry being configured to indirectly or directly receive an output signal from the detector circuit.
14. System according to aspect 12 or 13, further comprising: an electrosurgical tool configured to be operated by high voltage pulses generating a high frequency noise and electrical disturbance during operation.
15. System according to aspect 14, wherein the electrosurgical tool is provided to be inserted into the working channel of the endoscope, the high voltage pulses result in an electrical field, and the electrical field charges a sensor part of the detector circuit when the electrosurgical tool is accommodated and operated inside the working channel.

BRIEF DESCRIPTION OF FIGURES

The disclosure is explained in more detail below using preferred embodiments and referring to the accompanying figures.

Figure 1:
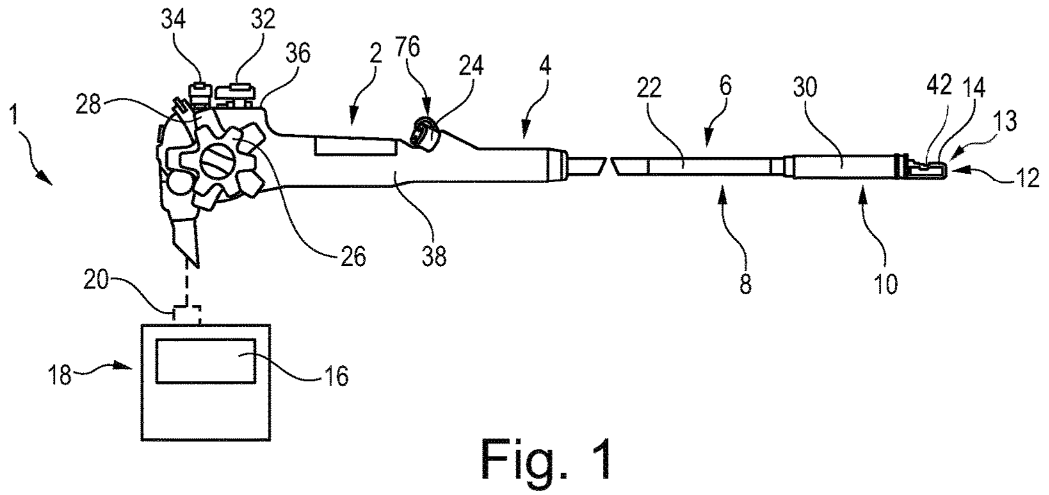
FIG. 1 is a plan view showing a system including an endoscope and a video processing apparatus according to the present disclosure.

The figures are schematic in nature and serve only to understand the disclosure. The features of the different embodiments can be interchanged among each other.

DETAILED DESCRIPTION OF PREFERRED EMBODIMENTS

The present disclosure may be further understood with reference to the following description and appended drawings, wherein like elements are referred to with the same reference numerals.

Figure 1A:
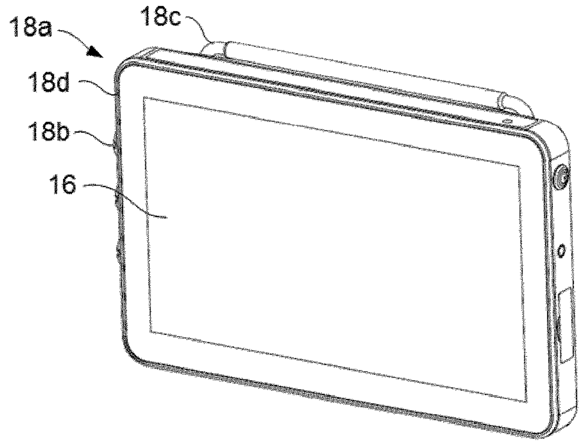
FIG. 1*a* is a perspective view of an embodiment of the video processing apparatus of FIG. 1.
Figure 1B:
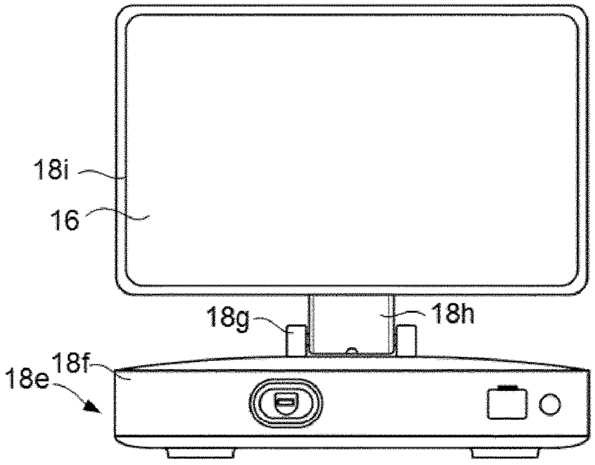
FIG. 1*b* is a front view of another embodiment of the video processing apparatus of FIG. 1.

In FIG. 1, a visualization system 1 including an endoscope 2 and a display unit 18 is shown. Display unit 18 may be referred to as a video processing apparatus (VPA), examples of which are shown in FIGS. 1*a* and 1*b* (described below). As further described below, the VPA 18, and variations thereof denoted as VPA 18*a* and VPA 18*e*, are configured to mitigate the impact of electrical noise caused by the use of an electrosurgical tool located in a working channel of the endoscope 2. The impact is mitigated by determining that there is electrical noise and, responsive to the determination, preventing malfunction of a camera module in the endoscope 2 by halting transmission of configuration signals from the VPA to the camera module.

In some variations, the endoscope 2 comprises an electrical noise detector and logic configured to transmit a noise detected signal to the VPA. The VPA may determine that there is electrical noise based on the noise detected signal or based on a mismatch between configuration parameters transmitted from an output buffer and read from an input buffer.

Advantages of the visualization system include, among others, prevention or mitigation of malfunction of the camera module while the electrosurgical tool is operated, reduction of the size of the insertion cord of the endoscope, and endoscope cost reductions. Size and cost reductions are possible when the malfunction is mitigated by means that do not require addition of electrical shielding between the electrosurgical tool and the communication wires in the endoscope, whether such shielding comprises shield braiding the communication wires or metallization and grounding of the working channel.

The endoscope 2 is preferably a single-use endoscope being essentially formed from parts of plastic/polymer material. The endoscope 2 comprises a proximal endoscope handle 4 designed to be held by an operator and being configured to accommodate operating parts of the endoscope 2. Here, the presence of a handle 4 is the preferred embodiment. However, it might be also possible to apply an interface instead of the handle which interface is adapted to be coupled to the distal end of a robotic arm or the like. Since such an interface has same functions as a handle but is substantially only different in outer shape, the handle is just shown in the figures as a synonym for both, handle and interface. Further, the endoscope 2 comprises an insertion cord 6, which is configured to be inserted into a patient's body cavity. The insertion cord 6 comprises an (flexible/passive bending) insertion tube 8, a (actively actuatable) bending section 10 and a distal tip unit 12, extending in this order from the endoscope handle 4.

At/in the distal tip unit 12, a camera module 13 is provided. The camera module 13 comprises an image sensor circuitry 42 and an image sensor 14. The image sensor circuitry 42 is configured to enable a setting up of the image sensor 14. The camera module 13 may comprise a light source such as light-emitting diodes or optical fibers connected to a light source, such that the patient's body cavity can be illuminated and inspected. The image sensor circuitry 42 may include, for example, a voltage regulator, capacitors and other passive devices to condition signals for the image sensor and the light sources. An image captured by the image sensor 14 can be shown on a display 16 of the display unit 18. The endoscope 2 may be connected with the display unit 18 via a plug and socket connection 20. The endoscope 2 may comprise a plug, which can be inserted into a socket of the display unit 18. It is to be understood that the display unit 18 does not necessarily comprise the display 16. Alternatively, there may be provided an external monitor/display which is not a part of the display unit 18 and which is connected with the display unit 18.

The endoscope 2 has an internal working channel 22. The working channel 22 is basically formed by a biopsy connector/Y-connector 76, a bendable/flexible polymer tube, i.e. a working channel tube 65, connected to the Y-connector 76 and a tip housing of the distal tip unit 12 at/in which the working channel 22 forms an opening to the environment. The Y-connector 76 comprises an access port 24 for introducing instruments into the working channel 22. The working channel tube 65 is provided in/inside the insertion cord 6 and extends from the Y-connector 76 provided in the endoscope handle 4 towards the distal tip unit 12. The working channel 22 is accessible via the access port 24. In particular, an electrosurgical tool 25 is an example of a minimal instrument that may be guided through the working channel 22 into the patient's body cavity via the Y-connector 76 and the working channel tube 65. The operator is thus able to perform medical procedures with tool 25 within the patient's body cavity.

The endoscope handle 4 comprises two operating units 26, 28, namely a first operating unit 26 and a second operating unit 28, for actively steering/bending the bending section 10 thereby orientating the distal tip unit 12 into determined directions. The endoscope handle 4 may alternatively comprise just one operating unit 26, 28. The operating unit 26, 28 may be a handle wheel or a lever. In the embodiment shown, a rotation/turning force can be applied to both the first operating unit 26 and the second operating unit 28 by the operator. As can be derived from FIG. 1, the first operating unit 26 and the second operating unit 28 are arranged coaxially, i.e. can be rotated around a common rotational axis. The first operating unit 26 and the second operating unit 28 are both formed as handle wheels in FIG. 1.

The distal tip unit 12 may be orientated into different directions by bending the bending section 10, respectively. The endoscope 2 shown in FIG. 1 is basically a two-plane bending endoscope. This means that the distal tip unit 12, or more concrete, the bending section 10 may bend in a first bending plane (e.g. in an up-and-down direction) and in a second bending plane (e.g. in a right-and-left direction). In particular, the first operating unit 26 can be operated by the operator to bend the distal tip unit 12/the bending section 10 in the first bending plane and the second operating unit 28 can be operated by the operator to bend the distal tip unit 12/the bending section 10 in the second bending plane. The first bending plane is preferably perpendicular to the second bending plane. It is to be understood that the endoscope 2 according to the present disclosure may also be a one-plane bending endoscope.

For achieving the above bending movements, the bending section 10 may comprise a plurality of segments, wherein two adjacent segments among the plurality of segments, i.e. a pair of segments, may be connected via corresponding flexible hinge members, respectively. The bending section 10 may be molded in a single piece including the segments and the hinge members connecting them, as is known in the art. The bending section 10 may be largely covered by a flexible tube-like outer cover 30 for preventing contamination.

The endoscope 2 may comprise steering wires 31 (not shown in FIG. 1) for controlling the bending movement of the bending section 10. The steering wires 31 which are guided within additional function channels inside the insertion cord may be connected to the first operating unit 26 and/or to the second operating unit 28. The steering wires 31 may extend through the whole insertion tube 8 and preferably the whole bending section 10 and are connected to the most distal segment of the bending section or to the distal tip unit. By turning the first operating unit 26, steering wires 31/steering wire portions can be pulled and released and the distal tip unit 12 can tilt according to a direction in which the first operating unit 26 is rotated. In other words, by operating the first operating unit 26 the operator is able to tilt the distal tip unit 12 in the first bending plane by bending the bending section 10 correspondingly. By turning the second operating unit 28, steering wires 31/steering wire portions can be pulled and released and the distal tip unit 12 may tilt according to a direction in which the second operating unit 28 is rotated. In other words, by operating the second operating unit 28 the operator is able to tilt the distal tip unit 12 in the second bending plane by bending the bending section 10 correspondingly.

The endoscope 2, in particular the endoscope handle 4, further comprises two valves, namely a gas/water injection valve 32 and a suction valve 34. The endoscope handle 4 may alternatively only comprise one valve 32, 34. The gas/water injection valve 32 and the suction valve 34 are arranged side by side on a top surface 36 of a handle housing 38 (in particular formed from two half shells) of the endoscope handle 4.

FIG. 1*a* shows a perspective view of a VPA 18*a* having the display 16, a socket 18*b*, a handle or stand 18*c*, and a housing 18*d* partly enclosing the display 16. The electrical wires 46 may be connected to the socket 18*b* to present live images, obtained by the camera module 13, with the display 16. The VPA 18*a* comprises an image processing device configured to receive the live images and convert them, if necessary, to a format suitable for the display 16. The image processing device comprises logic operable to present a graphical user interface to allow a user to manipulate image data with a touch screen, e.g. display 16, and, optionally, output a video signal to allow remote viewing of the images presented with the display 16. The VPA 18*a* may also include memory, having embedded therein a graphical user interface (GUI) logic, and a video output board. A wireless interface may be provided. Example wireless interfaces include Bluetooth and Zigbee controllers. The wireless interface may be configured to communicate with a display that is not integrated in the VPA 18*a*.

FIG. 1*b* shows a front view of a VPA 18*e* comprising a housing 18*f*. An optional display support interface 18*g* may be provided to physically mount a display support 18*h* connected to a display device 18*i* comprising the display 16. The display support interface 18*g* can be removed so the VPA 18*e* can be separated from the display device 18*i*. The display device 18*i* can then be placed in a convenient location, such as an IV-pole. An existing display device 18*i* may also be used, connected via a cable or wirelessly to the VPA 18*e*.

Figure 2:
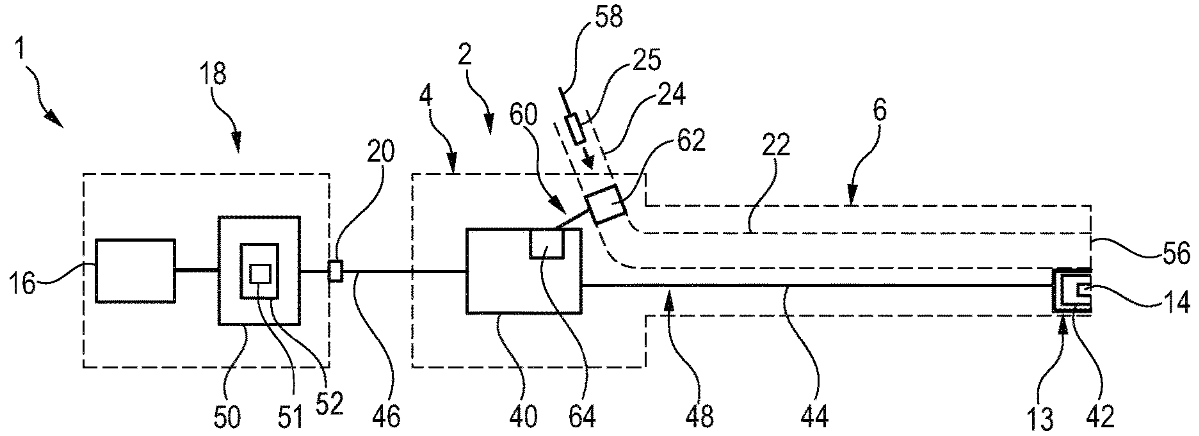
FIG. 2 is a schematic view showing electrical connections and communication lines provided in the endoscope and the display unit according to the present disclosure.

FIG. 2 is a schematic view showing electrical connections and communication lines provided in the endoscope 2 and the display unit 18 according to the present disclosure. As can be seen in FIG. 2, the endoscope handle 4 comprises a handle printed circuit board (handle PCB) 40, which is accommodated inside the handle housing 38. The handle printed circuit board 40 is electrically connected and in electrical communication with the camera module 13, in particular with the image sensor circuitry 42 and the image sensor 14, via electrical wires 44.

The display unit 18 is electrically connected and in electrical communication with the handle printed circuit board 40 via electrical wires 46 when the endoscope 2 and the display unit 18 are connected via the plug and socket connection 20 and is configured to power the handle printed circuit board 40, the image sensor circuitry 42 and the image sensor 14. In particular, the display unit 18 can communicate with the image sensor 14 via a communication bus 48 to transmit configuration information and may be referred to as a configuration bus. The image sensor circuitry 42 at the distal tip unit 12 is configured to handle communications via the communication bus 48. The communication between the display unit 18 and the handle PCB 40 may alternatively be wireless and the handle PCB 40 may alternatively be powered by a battery. Images captured by the image sensor 14 may be transferred to the display unit 18 via a separate image data bus (not shown), where they are processed. For this purpose, the display unit 18 comprises an input circuitry 50 comprising logic for communicating with the handle PCB 40 and for receiving the images captured by the image sensor 14. The input circuitry 50 may be a circuit board.

In the present embodiment, the configuration bus may operate at about 200 Kbits/second and the image data bus may operate at about 320 Mbits/second. The configuration bus may be a serial bus and the image data bus may be a MIPI bus comprising one or more differential data lines. Some examples of serial communication buses include $I^2C$ and SCCB (Serial camera control bus), which have both turned out to be suitable serial communication buses in accordance with the present disclosure. Parallel communication buses may also be used in circumstances where the insertion cord size allows for a larger communication bus.

In other embodiments, a single bus may be used to send configuration data and receive image data.

The input circuitry 50 may be implemented using a logic circuit, a FPGA (field programmable gate array) 52, or a DSP (digital signal processor) and so on. The input circuitry 50 comprises noise mitigation logic 51 configured to implement a noise mitigation method described with reference to FIGS. 13-15. The noise mitigation logic 51 is shown as being part of the FPGA 52 but the noise mitigation logic 51 can be embedded in memory of the logic circuit or DSP or accessible by them.

In particular, the input circuitry 50 is implemented using a FPGA 52 according to a preferred embodiment of the present disclosure. The display unit 18 is configured to display the processed images on the display 16. The FPGA 52 may comprise the noise mitigation logic 51. The FPGA 52 may comprise output and input buffers connected to a common pad. The output buffer is toggled to generate a clock signal on a clock line of the bus. The input buffer is used to read the present state of the clock line. The same setup can be used to control the data line of the bus.

The term "logic" as used herein includes software and/or firmware executing on one or more programmable processing devices, application-specific integrated circuits, field-programmable gate arrays, digital signal processors, hard-wired logic, or combinations thereof. Therefore, in accordance with the embodiments, various logic may be implemented in any appropriate fashion and would remain in accordance with the embodiments herein disclosed. Logic may comprise processing instructions embedded in non-transitory machine-readable media (e.g. memory).

As indicated in FIG. 2, an electrosurgical tool 25 configured to be operated by high voltage pulses (e.g. in a range of 4 kV to 5 kV), generating high frequency noise and electrical disturbance during operation, may be inserted into the working channel 22 via the access port 24. Such type of electrosurgical tool 25 is well-known in the prior art and is generally used for, for example tissue cauterization, and may be guided through the working channel 22 and out of a working channel orifice/opening 56 provided in the distal tip unit 12. During operation of the electrosurgical tool 25, the high voltage pulses result in a strong electric field (HF) that is experienced as noise on the communication bus 48. The noise may generate a negative effect on the communication, i.e. may result in an electrical disturbance. A noise which results in an electrical disturbance is designated as the high frequency noise and electrical disturbance according to the present disclosure. As the working channel 22 is preferably made of plastic material according to the present disclosure, the working channel 22 itself does not provide a good/sufficient shielding against high frequency noises and electrical disturbances. Therefore, the communication bus 48 using the wires 44, which are guided/run next to/adjacent/close to the working channel 22 inside the insertion cord 6, are quite susceptible to high frequency noises and electrical disturbances from the working channel. When the electrosurgical tool 25 is arranged distally with respect to the working channel orifice 56 inside a patient's body cavity, the image sensor circuitry 42 and the image sensor 14 are positioned relatively close to the electrosurgical tool 25 and thus to the source of the high frequency noises and electrical disturbances. As already mentioned, high frequency noises and electrical disturbances are, however, present along the entire working channel 22 due to the cable 58 transmitting the voltage around 4 kV to 5 kV to a tool tip of the electrosurgical tool 25.

To better appreciate the physical relation between the working channel and the communication bus it is helpful to note that the outer diameter of the insertion cord might be less than 5 mm, preferably less than 4 mm and even 3 mm or less. Within the outer diameter are included, in a cross-section, the walls of the bending section, the walls of the tube forming the working channel, and the camera module. Furthermore, the wires 44 may abut the wall of the working channel tube and be separated from the electrosurgical tool 25 merely by the thickness of the working channel tube wall. Since structures, including wire and wall thicknesses, impede flexure of the distal end of the insertion cord, and the insertion cord diameter is reduced to reduce the invasiveness of the medical procedures, it is desirable to minimize structure, e.g. wire and wall thicknesses, and reduce the outer diameters, which in turn increases the noise picked up by the communication bus and exacerbates the problem solved by the present solutions.

Moreover, the display unit 18 is configured to write exposure data to the image sensor 14 via the communication bus 48, in specific the wires 44. The exposure data and other data that sets up the functioning of the image sensor are referred to as configuration data. The configuration data may include shutter speed, orientation, white balance, etc. The configuration data is written to registers provided in the image sensor for that purpose. The registers can also be read. Thus, the VPA may write to a register and then read from it to confirm that the data was written correctly.

In particular, during data transmission over the communication bus 48, data are written in one register in the image sensor 14 with, for example, four bytes including device address, two register addresses and configuration data. During operation of the electrosurgical tool 25, the high frequency noise and electrical disturbance on the communication bus 48 may cause in wrong bit insertion and bits missing of the data transmitted during the data transmission.

Therefore, as shown in FIG. 2, the endoscope 2 according to the present disclosure may comprise a detector circuit 60, which detects a presence of a high frequency noise and electrical disturbance arising from a use of the electrosurgical tool 25 in the working channel 22. The detector circuit 60 comprises a sensor part 62, which detects the presence of the high frequency noise and electrical disturbance, and a circuit part 64, which is electrically connected with the sensor part 62. The sensor part 62 is positioned in the vicinity of the working channel 22 (in particular on an outer surface of the working channel tube 65 or of the Y-connector 76) so as to at least partly surround the working channel 22, as already indicated in FIG. 2. The sensor part 62 may be positioned on the working channel 22, preferably inside the handle housing 38. The sensor part 62 may be positioned at least partly around a portion of the working channel 22, preferably inside the handle housing 38. The sensor part 62 is an electrically conductive part or at least has an electrically conductive surface that can build a capacity charge. The circuit part 64 of the detector circuit 60 may be, as shown in FIG. 2, comprised in the handle printed circuit board 40.

When a high frequency voltage is present in the working channel 22, the sensor part 62 is configured to input a noise detected signal, e.g. a voltage, into the circuit part 64. The circuit part 64 is configured to provide an output signal, which is communicated to the display unit 18. The output signal is dependent on the voltage input to the circuit part 64 from the sensor part 62. In particular, the output signal may indicate that a high frequency noise and electrical disturbance is present, or may indicate that no high frequency noise and electrical disturbance is present. The output signal of the circuit part 64 serves as an input to the display unit 18, which based on the input signal temporarily may terminate some or all communications on the communication bus 48. In one variation, the display unit or VPA 18 ceases transmission of configuration data but continues to receive image data based on the configuration data last transmitted to the camera module (e.g. before the noise was detected). The camera module is unaware of the noise. Due to the timing of the high frequency voltage when the electrosurgical tool 25 is actuated and the timing of the communications, the output signal may be transmitted to the VPA 18 before configuration data is transmitted to the camera module while the electrical noise is present. Additionally, a stop command/signal may be transmitted over the communication bus to cause the camera module to cease reception of the configuration data.

The output signal is transmitted via the wires 46 from the handle printed circuit board 40 to the display unit 18. In this way, an already existing bus like the communication bus 48 (which is basically used for the transmission of images) may be used to transmit the output signal and there is no need to provide an additional communication bus according to the present disclosure. The output signal of the circuit part 64 may be considered as a trigger signal. In particular, when the output signal/trigger signal turns low, a communication line like the clock line of the communication bus 48 may be pulled down. Alternatively, the output signal may also be directly transmitted to the display unit 18. The present disclosure provides embodiments of algorithm/methods which are performed when the output signal indicating the presence of a high frequency noise and electrical disturbance is directly or indirectly received by the input circuitry 50 of the display unit 18. The display unit 18 is configured to continuously check for the presence of a high frequency noise and electrical disturbance in the working channel 22 which may affect the communication bus 48. As will be described in more detail below, the display unit 18 terminates the communication on the communication bus 48 at least for a certain period of time in case of the presence of the high frequency noise and electrical disturbance.

Figure 3:
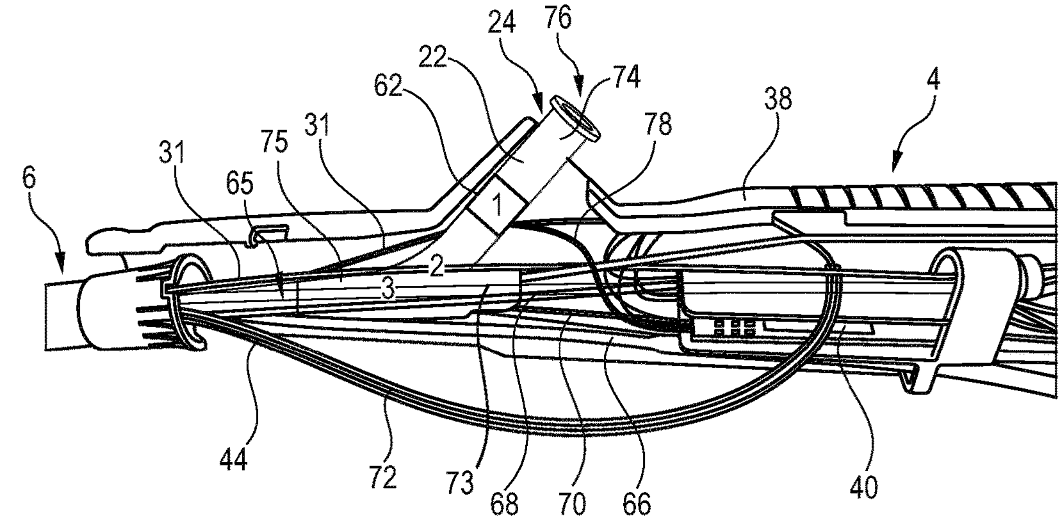
FIG. 3 is a perspective view showing an endoscope handle of the endoscope in an open configuration.

FIG. 3 shows the handle housing 38 of the endoscope handle 4 in an open configuration, i.e. with one half shell of the two half shells forming the handle housing 38 being removed. It can be seen that a working channel tube 65 forming a part of the working channel 22 extends from the Y-connector 76 into the insertion cord 6. Moreover, it can be seen that a plurality of other (function-) tubes like a waterjet tube 66, a rinsing tube 68, an insufflation tube 70, a wire tube 72 comprising the electrical wires 44, and steering wires 31 are guided into the insertion cord 6.

In FIG. 3, the sensor part 62 is placed on the Y-connector 76 which comprises the access port 24. The Y-connector 76 further comprises a first inlet channel 73, a second inlet channel 74 merging into the first inlet channel 73 and a common outlet channel 75. The second inlet channel 74 is angled with respect to the first inlet channel 73 by an angle of less than 90°. The outlet channel 75 forms an extension of the first inlet channel 73. The first inlet channel 73, the second inlet channel 74 and the outlet channel 75 are thus arranged with respect to each other approximately like a Y. The working channel tube 65 is connected to the outlet channel 75. An electrosurgical instrument 25 may be inserted into the working channel tube 65 via the second inlet channel 74 and the outlet channel 75. One can thus say that the second inlet channel 74, the outlet channel 75, the working channel tube 65 and the tip housing of the distal tip unit 12 in combination form the working channel 22, and the second inlet channel 74 serves as the access port 24. Three possible arrangements/positions/locations (1), (2) and (3) of the sensor part 62 are shown, wherein the sensor part 62 is only drawn in position (1). As can be seen in FIG. 3, the sensor part 62 in accordance with position (1) is located around/on an outer surface of the second inlet channel 74. In accordance with position (2) the sensor part 62 may also be located around the Y-connector 76 in a transition area between the second inlet channel 74 and the outlet channel 75. In accordance with position (3) the sensor part 62 may also be located around the outlet channel 75 of the Y-connector 76. It is to be understood that the sensor part 62 may also be arranged around the working channel tube 65 connected to the outlet channel 75. Anyway, the sensor part 62 is preferably arranged inside the handle housing 38 of the endoscope handle 4, in order to be close to the handle printed circuit board 40. However, it is also to be understood that the present disclosure is not limited to this configuration and the sensor part 62 may basically be arranged anywhere (i.e. also in the entire insertion cord 6) in the vicinity of the working channel tube 65.

The sensor part 62 may be made of a conductive material. In particular, the sensor part 62 is formed as an electrically conductive foil or tape in FIG. 3 and is bent or shaped to follow a contour of the working channel 22. E.g. the sensor part 62 may be made of a copper foil or a flexible PCB positioned close to the outer surface of the working channel 22, in particular to the outer surface of the Y-connector 76 or the working channel tube 65. The sensor part 62 may be glued to the outer surface of the working channel 22. The sensor part 62 may have a surface area of between 0.5 $cm^2$ and 2 $cm^2$, in particular around 1 $cm^2$, in order to provide a sufficient capacitance for detecting the high frequency noise and electrical disturbance, and (at least partly) surrounds the working channel 22, in order to better be able to detect the high voltage pulses which may cause high frequency noises and electrical disturbances on the communication bus 48. In the configuration shown in FIG. 3, when the electrosurgical tool 25 is inserted into the working channel 22, the sensor part 62 (in particular a surface of the sensor part 62) is positioned quite close to the electrical high frequency noise source (the electrosurgical tool 25 or its cable 58). Therefore, the sensor part 62 is charged by an electric field generated from the high frequency noise and electrical disturbance generated by the electrosurgical tool 25 operated inside the working channel 22. Without being bound by theory, it is believed that a capacitor is formed by the electrosurgical tool 25 and the sensor part 62, with the wall of the working channel and the air between the electrosurgical tool 25 (or its cable 58) and the sensor part 62 defining the dielectric of the capacitor.

Figure 4:
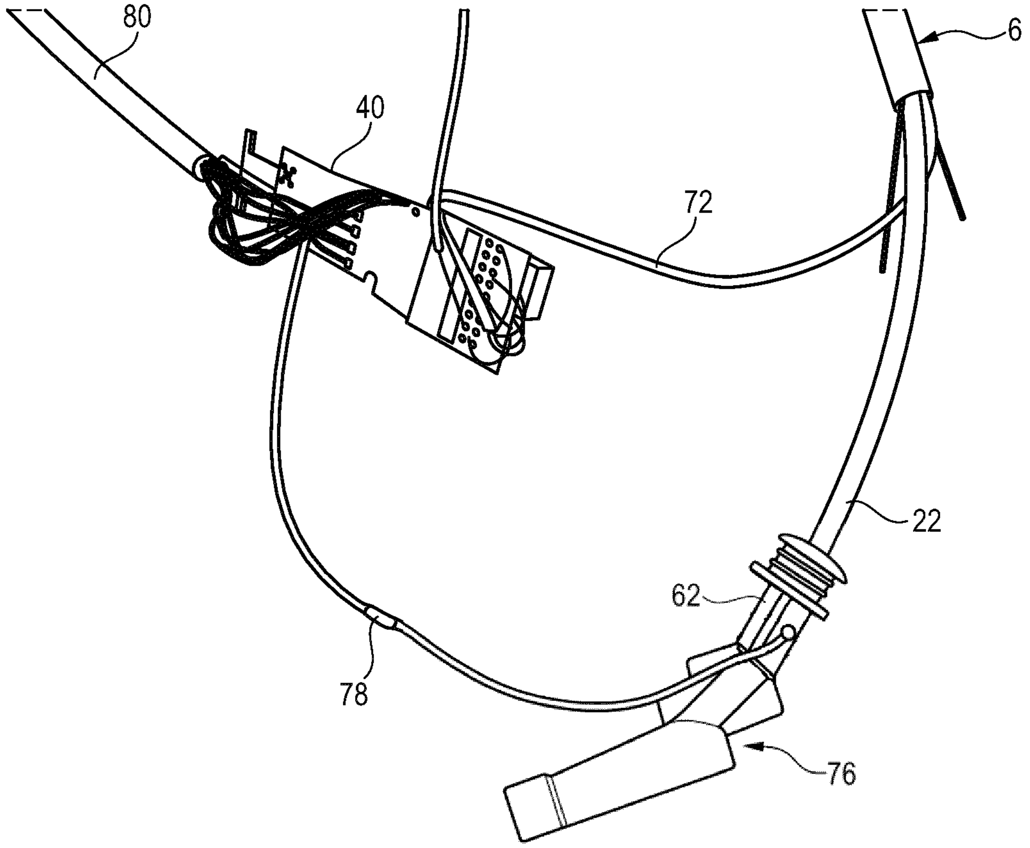
FIG. 4 is a perspective, illustrative view showing a sensor part and a handle printed circuit board in a state disassembled from the endoscope handle.

As better shown in FIG. 4, the sensor part 62 is preferably arranged around/on an outer surface of the Y-connector 76. In order to be charged by the high frequency noise and electrical disturbance generated by the electrosurgical tool 25 operated inside the working channel 22, the sensor part 62 should have a distance of less than 3 mm, in particular of less than 2 mm, e.g. of between 1 mm and 2 mm, from the inside of the Y-connector 76. Therefore, a wall thickness of the Y-connector 76 should be suitably adjusted. Alternatively, the surface area of the sensor part 62 can be increased to increase its sensitivity.

FIG. 4 also shows that the sensor part 62 is connected with the handle printed circuit board 40 via a cable 78. In addition, FIG. 4 shows a first cable conduit 72 running from the handle printed circuit board 40 into the insertion cord 6 and a second cable conduit 80 running from the handle printed circuit board 40 toward the display unit 18.

As mentioned above, the detector circuit 60 outputs a signal, the noise detection signal, which the VPA 18 may use to determine that there is electrical noise. The noise detection signal can be generated by the detector circuit 60 when the input signal exceeds a threshold and communicated by changing the state of a line of the configuration bus 48. The sensor part 62 may comprise the capacitor 84 but other sensors that detect significant changes in the quantity of electrical energy may be used, for example wires functioning as antennas, inductors, etc. The circuit part 64 potentially amplifies the input signal so that it can be used by the remaining parts of the circuit, sets the value of the threshold, and generates the output signal when the input signal (or the amplified input signal) crosses the threshold.

Figure 5:
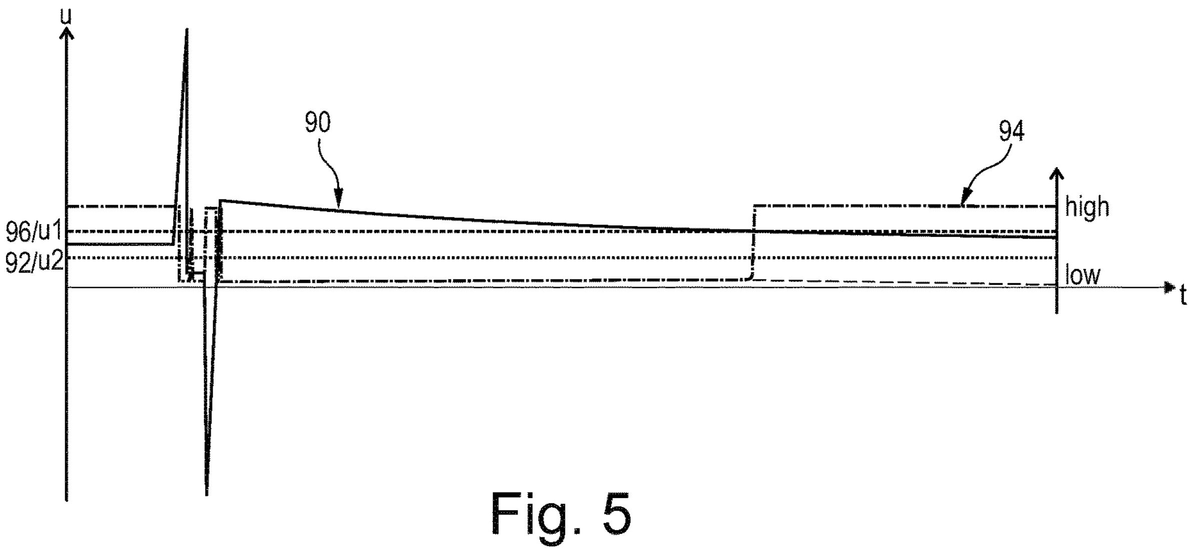
FIG. 5 shows a diagram illustrating a functioning of a window comparator comprised in the detector circuit according to the present disclosure.

In some embodiments, the circuit part 64 is a window comparator. The window comparator has two thresholds instead of one. The functioning of the window comparator is better understood with reference to FIG. 5, in which an input voltage 90 (solid line) generated by the sensor part 62 and an output signal 94 (dash-dot-line) generated by the circuit part 64 are shown. The window comparator has an upper threshold voltage 96/u1 (dashed line) and a lower threshold voltage 92/u2 (dotted line). The horizontal axis represents time and the vertical axis represents amplitude of voltages. The input and output voltages are not necessarily on the same voltage scale. The upper threshold voltage 96/u1 and the lower threshold voltage 92/u2 define the threshold voltages for determining a high frequency noise and electrical disturbance. It can be seen that when the input voltage 90 is in the window (between the upper threshold voltage 96/u1 and the lower threshold voltage 92/u2), the output signal 94 is "high", which is considered as no high frequency noise and electrical disturbance detected, whereas when the input voltage 90 is outside the window (above the upper threshold voltage 96/u1 or below the lower threshold voltage 92/u2), the output signal 94 is "low", which is considered as a presence of a high frequency noise and electrical disturbance. More generally, the output signal of the circuit part 64 changes state when the input voltage transmitted from the sensor part 62 transitions from being inside the window to being outside the window and vice versa. In a single-threshold comparator either the upper or lower threshold voltages may be used to generate the output/trigger signal 94.

Having described the functionality of a window comparator, attention is now directed to the detection of noise. In some embodiments, described with reference to FIGS. 6 and 7, the noise is detected by the detector circuit. In other embodiments, the noise is detected by the noise mitigation logic based on the state of the input buffer of the FPGA 52 corresponding to the output buffer of the respective line of the bus, or an equivalent bit of the circuit 50.

Figure 6:
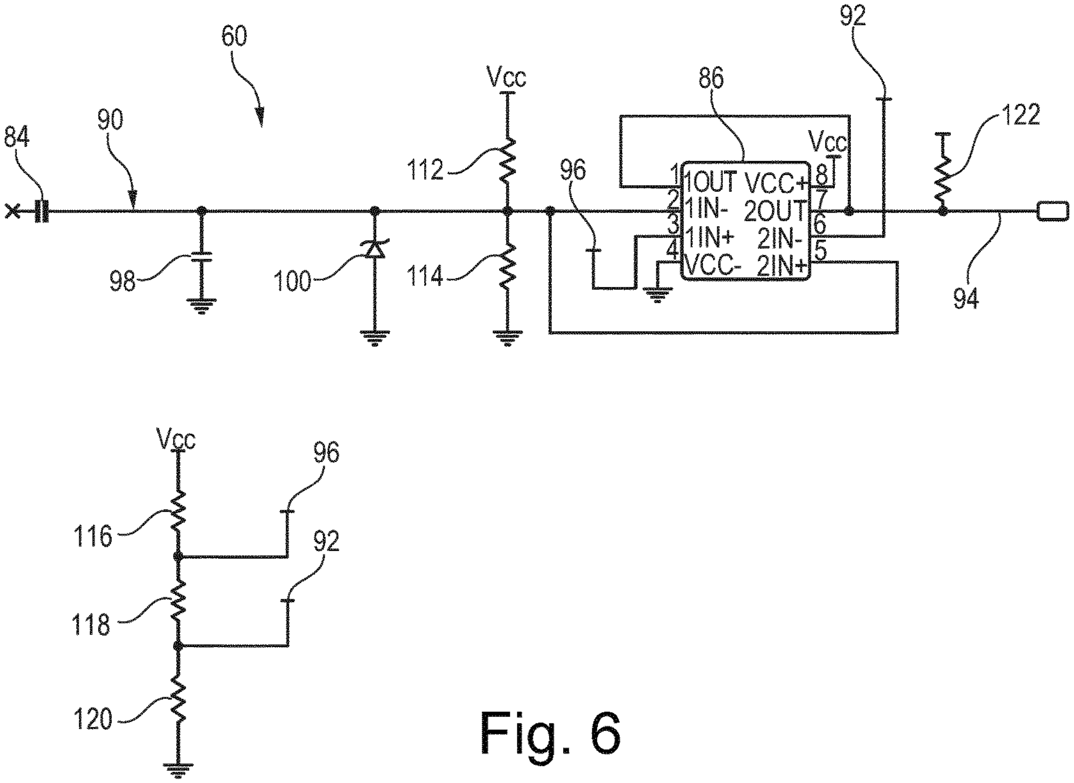
FIG. 6 shows a first embodiment of an electrical circuit forming a detector circuit according to the present disclosure.
Figure 7:
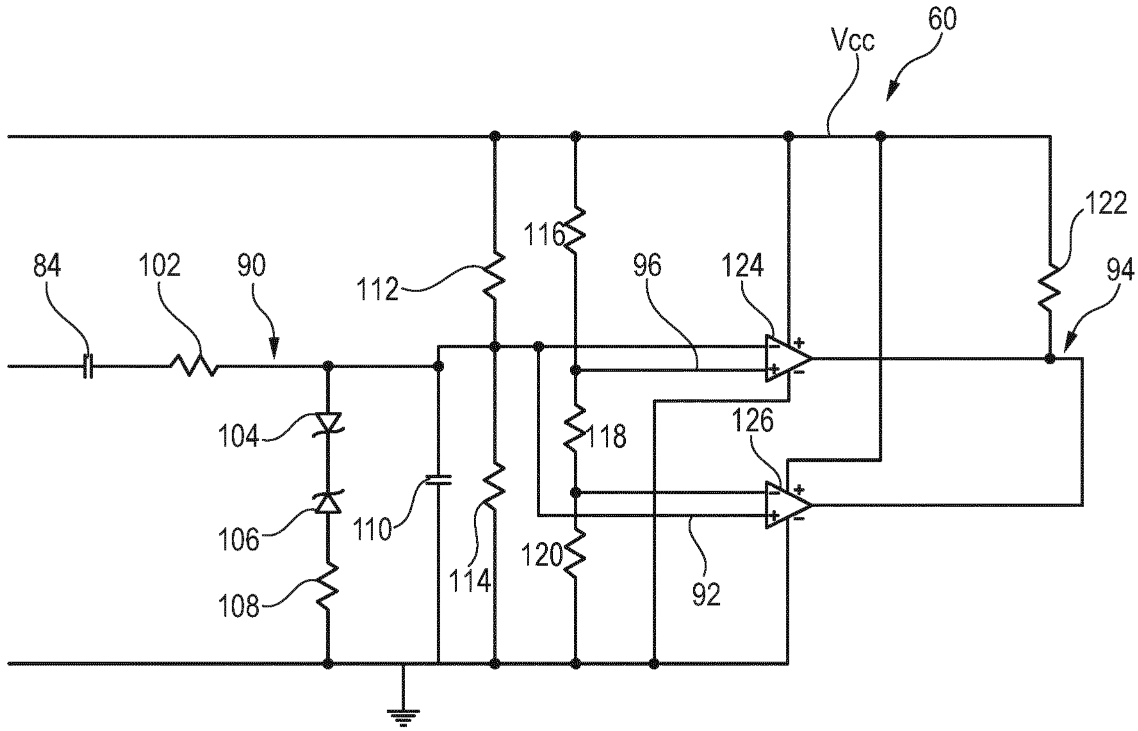
FIG. 7 shows a second embodiment of an electrical circuit forming a detector circuit according to the present disclosure.

FIG. 6 and FIG. 7 show electrical diagrams of two embodiments of the detector circuit 60. The two embodiments are based on the same concept, but are slightly differently implemented. Both detector circuits 60 comprise a capacitor 84 (i.e. the sensor part 62) which is electrically connected with a window comparator circuit (included in the circuit part 64), which is illustrated as an IC (integrated circuit) chip 86 in FIG. 6, and which is illustrated as two op-amps (operational amplifiers) 124, 126 in FIG. 7. An output of the window comparator circuit is communicated to the display unit 18 via the communication bus 48, for example with a clock line of the communication bus 48.

Functionally, the capacitor 84 is charged by the high frequency noise and electrical disturbance generated during operation of the electrosurgical tool 25 inside the working channel 22. As described with reference to FIG. 5, the upper and lower threshold voltages 92, 96 define the range of high frequency noises and electrical disturbances (the detection window) that trigger the noise detection signal. Once the input voltage 90 is outside the range between the upper and lower threshold voltages 92, 96, the output voltage 94 turns low and can, further, pull down a connected line in the communication bus 48, for example a clock line of the communication bus 48.

In electrical detail, in FIG. 6 the capacitor 84 is electrically connected to pins 1IN− and 2IN+ of the IC chip 86, which may be a dual voltage comparators integrated circuit. The upper threshold voltage 96 is electrically connected to pin 1IN+ and the lower threshold voltage 92 is electrically connected to pin 2IN− of the IC chip 86. The voltage supply Vcc is applied to pin Vcc+ and ground to pin Vcc−. A capacitor 98 acts as a filter and a Zener diode 100 acts as a voltage regulator. A resistor 122 pulls up the output 94 until either of pins 1 or 7 goes low, pulling down the output 94.

Similarly, the capacitor 84 in FIG. 7 is—via an optional resistor 102—electrically connected to an inverting terminal of an op-amp 124 and to a noninverting terminal of an op-amp 126. The upper threshold voltage 96 in FIG. 7 is electrically connected to a noninverting terminal of the op-amp 124 and the lower threshold voltage 92 is electrically connected to an inverting terminal of the op-amp 126. The voltage supply Vcc is applied to a positive power supply of the op-amps 124, 126 and ground to a negative power supply of the op-amps 124, 126. Zener diodes 104, 106 with the resistor 102 form a Zener clamp to prevent a voltage from exceeding a specified value, wherein a resistor 108 is designed to limit the current to a safe value for the Zener diodes 104, 106. A capacitor 110 acts as a filter.

Further, a bias circuit can be provided at the input of the window comparator circuit electrically connected with the capacitor 84 using a voltage divider with two resistors 112, 114 in both FIG. 6 and FIG. 7, so that the voltage at the input of the window comparator circuit can be quickly biased to a voltage value designed by the bias. In particular, the values of the resistors 112, 114 can be set equal, therefore the designed voltage value of the bias may be set to be ½ Vcc.

The lower and upper threshold voltages 92, 96 are preferably set using a voltage divider network formed of three resistors 116, 118, 120. The three resistors 116, 118, 120 may be chosen to have equal resistance values. The voltage may thus drop across each resistor by one third of the voltage supply Vcc. Therefore, the upper threshold voltage 96 in this example may be set to ⅔ Vcc and the lower threshold voltage may be set to ⅓ Vcc. The resistors 116, 118 and 120 may be set at any values for adjusting the lower and upper threshold voltages 92, 96.

Additionally, the pull up resistor 122 can be provided at the output of the window comparator circuit, which can be connected to the same power supply as the window comparator or to a separate power supply available in the handle PCB 40.

The circuits in FIG. 6 and FIG. 7 only show two exemplary designs of the detector circuit 60. The peripheral electrical components around the capacitor 84 and the window comparator 86, 124, 126 may be adjusted according to different design requirements. For a single-threshold design, pins 1-4 or 5-8 of the IC chip 86 may be used and one of the op-amps 124 and 126 may be used.

In an alternative practical embodiment, no detector circuit 60 is provided in the endoscope 2. According to said alternative embodiment, the input circuitry 50 continuously checks or monitors a communication line on the communication bus 48. The communication bus 48 between the display unit 18, the handle PCB 40 and the camera module 13 in the distal tip unit 12 may be based on master/slave protocol. The input circuitry 50 at the display unit 18 is preferably the master and may pull down or raise, i.e. may set, (a signal of) the communication line on the communication bus 48. The input circuitry 50 may then continuously check or monitor whether the (signal of the) communication line is actually as originally set. The input circuitry 50 is configured to determine whether the communication line is in an unexpected state, i.e. in a state which has not been initially set by the input circuitry 50. This may be interpreted by the input circuitry 50 as a presence of a high frequency noise and electrical disturbance on the communication bus 48, described below as a mismatch or collision.

In particular, the input circuitry 50 as the master may control the clock line and send a clock signal via the clock line. The handle PCB 40 may be the slave and may receive the clock signal from the master via the clock line. If the output signal of the clock line set by the input circuitry 50 for instance is pulled down to low, but the clock line of the communication bus 48 is suddenly in an unexpected high state, the input circuitry 50 may consider it as a presence of the high frequency noise and electrical disturbance on the communication bus 48. This comparison of the output signal of the clock line set by the input circuitry 50 and the input signal of the clock line received from the handle PCB 40 is performed by the input circuitry 50. An input/output signal mismatch is indicative of noise and may be described below as a collision.

A comparison signal, which indicates the result of the comparison, may be generated by the input circuitry 50. Once the difference of the comparison exceeds a predetermined threshold, the input circuitry 50 may pull down the comparison signal to "low", which is considered as a presence of the high frequency noise and electrical disturbance on the communication bus 48.

To sum up, the method according to the alternative practical embodiment is implemented on the input circuitry 50 of the display unit 18 and is configured to continuously check for a high frequency noise and electrical disturbance on the communication bus 48, by monitoring a communication line on the communication bus 48. Preferably, the input circuitry 50 compares an output signal of the clock line set by the input circuitry 50 (as "controller/master") with the input signal of the clock line from the handle PCB 40 (as "peripheral/slave") to determine a presence of the high frequency noise and electrical disturbance on the communication bus 48 without using a detector circuit 60.

As discussed above, the present disclosure has been developed considering the nature of electrosurgical (e.g. plasma surgical) tools 25 used in endoscopic procedures. Usually such electrosurgical tools 25 emit electrical noise signals comprising a burst of (individual) pulses/bursts of (individual) pulses comprising high voltage pulses and a wide range of frequencies, and there is the risk that an individual pulse of the burst(s) of pulses may disturb the communication bus 48 (e.g. the $I^2C$ bus).

Figure 8:
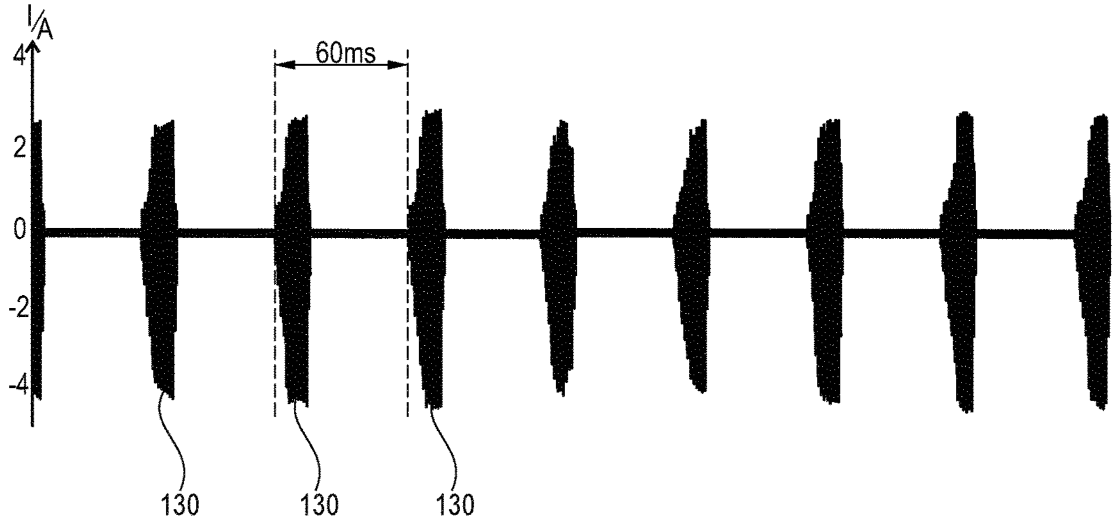
FIG. 8 shows a diagram illustrating a pulsing of an electrosurgical tool in a fast pulse mode.
Figure 9:
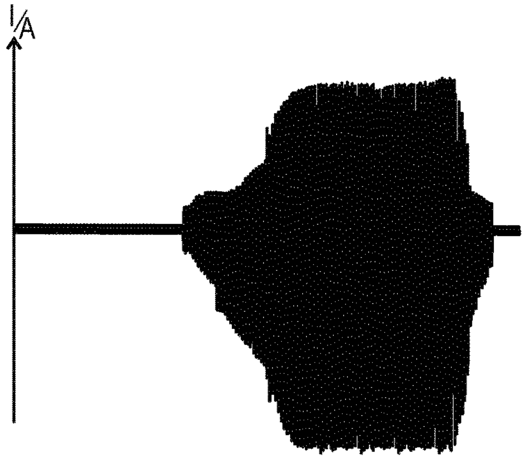
FIG. 9 shows one burst of pulses out of a plurality of burst of pulses shown in FIG. 8.
Figure 10:
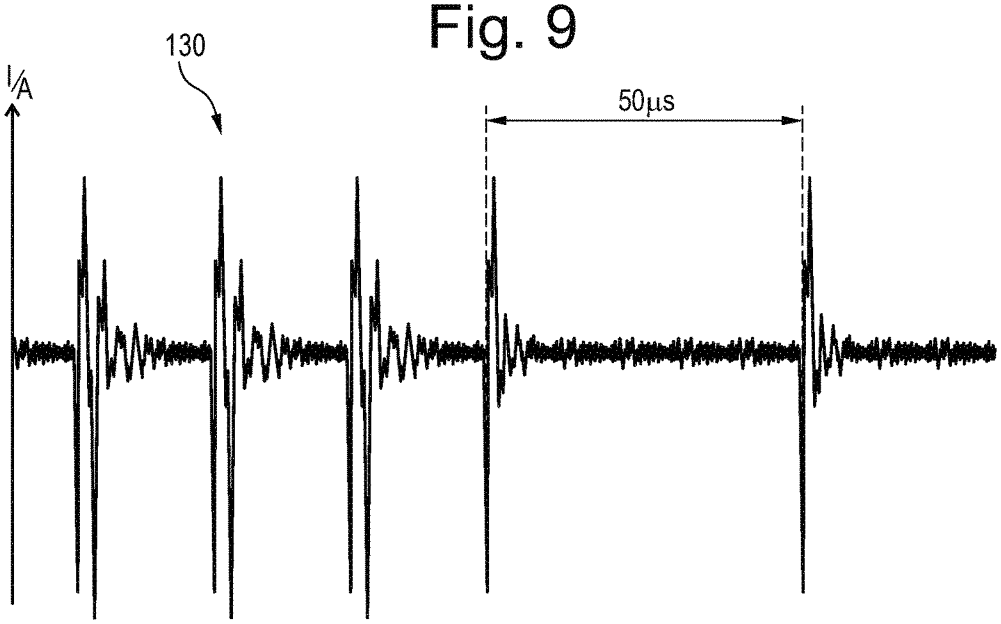
FIG. 10 shows individual pulses of the burst of pulses shown in FIG. 9.
Figure 11:
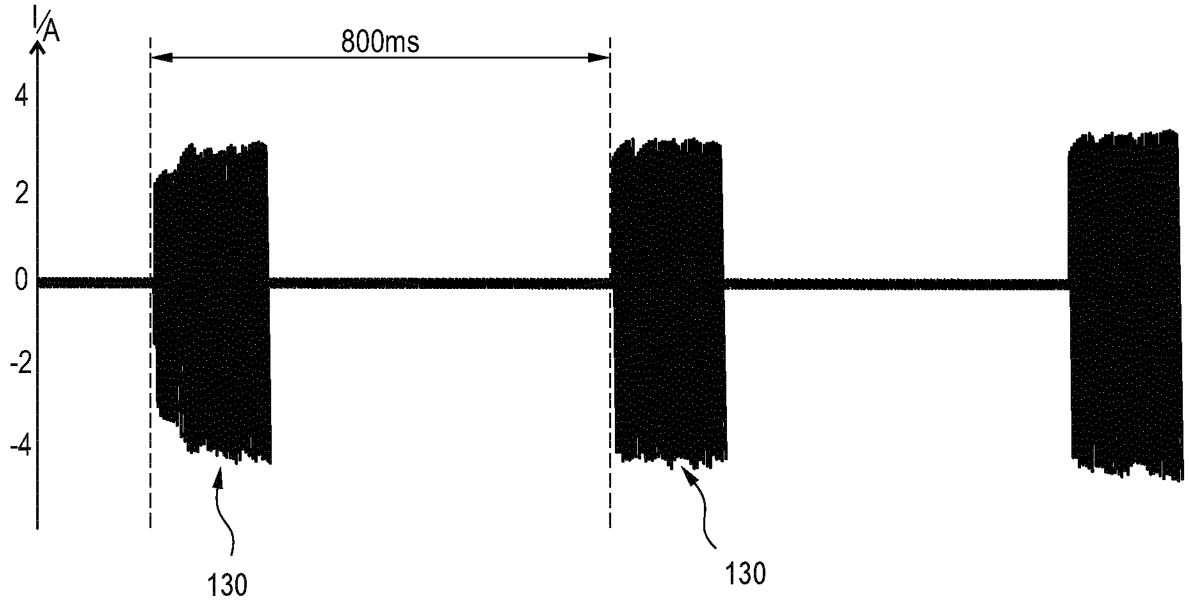
FIG. 11 shows a diagram illustrating a pulsing of an electrosurgical tool in a slow pulse mode.
Figure 12:
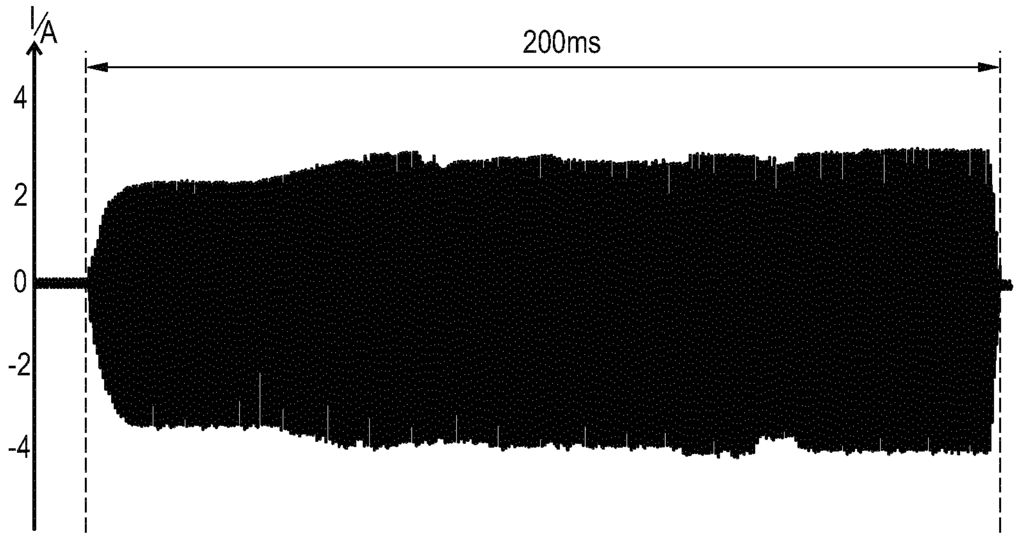
FIG. 12 shows one burst of pulses out of a plurality of bursts of pulses shown in FIG. 11.

Electrosurgical tools may be operated in different modes to perform a desired medical procedure. FIG. 8 e.g. shows a pulsing of the electrosurgical tool 25 in a fast pulse mode. In this mode, the electrosurgical tool 25 pulses the current at a fast rate (e.g. 125 MS/s). It can be seen that a plurality of bursts of pulses 130 periodically occurs when the electrosurgical tool 25 pulses the current at the fast rate in this mode. Two bursts of pulses 130 are spaced by about 60 ms (their beginnings). FIG. 9 shows in more detail one burst pulse 130 (of the plurality of bursts of pulses 130 shown in FIG. 7). Individual pulses are basically spaced closer in the beginning of the burst of pulses 130 compared to the end of the burst of pulses 130. This gets clear when looking at FIG. 10, which shows the transition/change from initial faster individual pulses to slower individual pulses in the burst. Two slower individual pulses are spaced by about 50 μs, as can be seen in FIG. 10. FIG. 11 and FIG. 12 show a pulsing of the electrosurgical tool 25 in a slow pulse mode. As can be seen in FIG. 11, two bursts of pulses 130 are spaced by about 800 ms in the slow pulse mode (their beginnings). In FIG. 12, it can be seen that a single burst of pulses 130 lasts around 200 ms in the slow pulse mode. The individual pulses in both the fast pulse mode and the slow pulse mode being high voltage pulses may result in a strong electric field that may cause a high frequency noise and electrical disturbance propagating in the working channel 22 and affecting the communication bus 48, leading to a writing of wrong data and/to wrong addresses in the image sensor 14. The waveforms of the individual pulses have been measured using a HF electrosurgical tool 25 in APC (argon plasma coagulation) mode, which can also represent a general characteristics of high frequency noises and electrical disturbances generated in a common HF electrosurgical tool.

Figure 13:
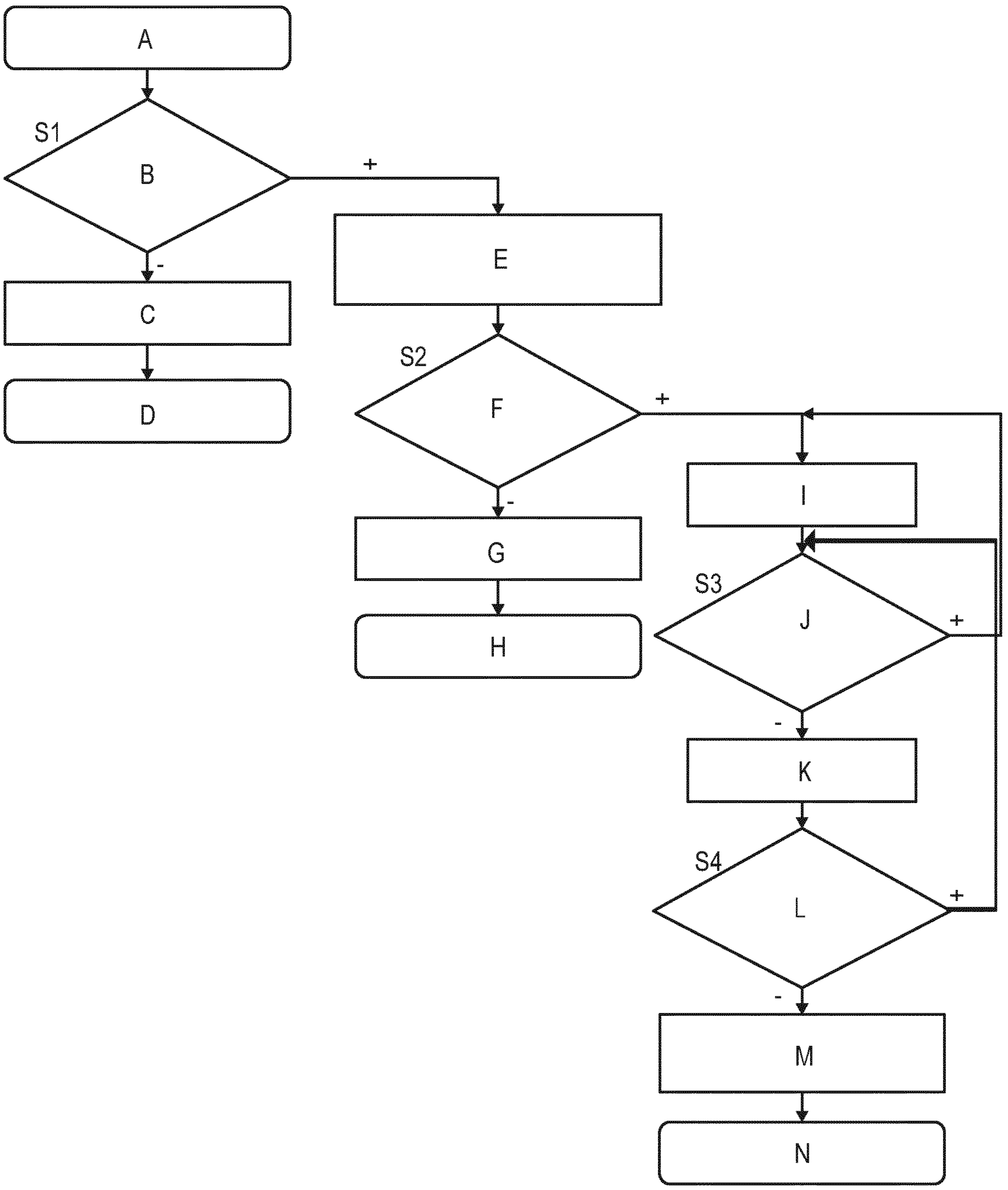
FIG. 13 shows a flow chart of an embodiment of a noise detection method in accordance with the present disclosure.

Referring to FIG. 13, a method of mitigating the effect of high frequency noise is provided. According to the method, the display unit 18 terminates the communication with the image sensor 14 on the communication bus 48 at least for a certain period of time in case of a presence of the high frequency noise and electrical disturbance. The display unit 18 considers the described nature of electrosurgical tools 25 with respect to pulsing both in the fast pulse mode and the slow pulse mode. The method is implemented by the noise mitigation logic 51 in the display unit 18. The functionality of the noise mitigation logic is exemplified by the flow charts depicted in FIGS. 13 to 15.

Generally, the method of mitigating the effect of high frequency noise is timed based on a profiling of the noise. As described above, in the example of the high frequency noise the pulse bursts are spaced 60 milliseconds apart. Thus, two bursts span 120 milliseconds. If more than 60 milliseconds pass after the last detected burst, it is possible to conclude that the high frequency pulses have ended, but a safer approach is to wait more than 120 milliseconds (two burst cycles plus the duration of a burst), for example 125 milliseconds, during which time if the tool was operational there would be two or three bursts, thus if no bursts are detected in that time it is safe to conclude that the tool is not operational or not operating in a mode that creates noise. The safe time of 125 milliseconds will be referred to as "t2" and corresponds to a burst cycle of 60 milliseconds. If the tool is profiled and the profile has a different burst cycle, t2 will be adjusted accordingly. Of course a time greater than one cycle but less than approximately two cycles plus the burst duration could be used.

The method senses signal collisions (lines have values different than the values commanded or an endoscope wire indicates that the sensor detected noise) periodically during short windows, e.g. t1, to detect the collisions indicative of high frequency pulse bursts and, optionally, prevent termination of communications on the configuration bus if the collision is a random event. If noise is detected, the method terminates communications on the configuration bus using one or more of several techniques discussed below. Once the noise stops for a safe period of time, e.g. t2, the method restarts communications on the configuration bus. The method can be enhanced to avoid detecting collisions during signal transition periods, e.g. transition edges based on rise/fall times. Embodiments of the method are described in more detail with reference to FIGS. 13 to 15.

In the flow chart shown in FIG. 13, following abbreviations are used:

A: Start
B: Noise detection signal received?
C: Continue operation of communication bus
D: Return
E: Block communication bus and look for further noise for time t1
F: Further noise detection signal received?
G: Restart operation of communication bus
H: Return
I: Wait for time t1
J: Further noise detection signal received during t1?
K: Wait for time t2
L: Further burst of pulses detected during t2?
M: Restart operation of communication bus
N: Return
+: yes
−: no In particular, at B, the noise mitigation logic determines first (step S1) whether noise is present. The presence of noise can be determined when the noise mitigation logic receives a noise detection signal. The noise detection signal can be the output signal received indirectly or directly from the detector circuit 60 or a comparison signal generated by the input circuitry 50 of the display unit 18, as described below.

In case no noise detection signal is received ("No"), the operation of the communication bus 48 is continued, at C. In case the noise detection signal is received ("Yes"), the communication bus 48 is immediately blocked, i.e. the communication on the communication bus 48 is terminated/stopped temporarily, at E. Therefore, it is prevented that an individual pulse causes a disturbance of the communication bus 48. In some embodiments, when the particular communication bus protocol permits doing so, if the noise is detected while a transmission of a command/configuration packet is in progress, a stop condition command is transmitted on the bus to gracefully end the transmission of the packet, then the bus is blocked responsive to a command from the noise mitigation logic.

Then at F, (as a step S2) the noise mitigation logic checks/looks for further noise/for a further noise detection signal for a first, short period of time t1, e.g. for 1 ms. In case no further noise/no further noise detection signal is received during the first, short period of time t1 ("No"), the noise detection signal received in step S1 was random noise. In particular, individual pulses of a burst of pulses are usually spaced by about 50 μs. The first, short period of time is thus set such that it is sufficiently longer than 50 μs (e.g. 1 ms) so that one certainly knows that the individual pulse detected in S1 is not part of a burst of pulses. In case it is determined that the noise detection signal received in S1 was random noise (i.e. in case no further noise is received during the time t1), communication on the communication bus 48 is continued, at G.

In case further noise/a further noise detection signal is received during the first, short period of time t1 ("Yes"), the noise mitigation logic is configured to wait again for the first, short period of time t1 and to determine whether a further noise/a further noise detection signal is received during said period of time t1, at J (step S3). In case of a further noise ("Yes") this process is repeated. The noise mitigation logic is thus configured to wait until no further noise detection signal has been received for the period of time t1. When no further noise detection signal has been received for the period of time t1, this means that an end of a burst of pulses 130 has been reached.

In a next step, at K, the noise mitigation logic is configured to wait for a second, long period of time t2, e.g. 125 ms. The second, long period of time is set such that another burst of pulses in the fast pulse mode would be detected. It is thus prevented that communication of the communication bus 48 is continued during a fast pulse mode operation of the electrosurgical tool 25. In case a further burst of pulses 130 is detected during the second, long period of time t2, at L (step S4), the method returns to detecting during periods t1 until the end of the burst is detected, and then again wait for the second, long period of time t2. This process is repeated as long as a further burst of pulses 130 is detected during a second, long period of time t2. Only if no further burst of pulses 130 is detected during the second, long period of time t2, the operation of the communication bus 48 is restarted, at M.

In a practical implementation of the present disclosure, the method shown in FIG. 13 is implemented by the noise mitigation logic on the FPGA 52 that forms part of the input circuitry 50 of the display unit, or VPA, 18. The FPGA 52 can be easily updated and configured to implement and perform the method of the present disclosure. When the noise is detected based on a mismatch or collision on a line of the configuration bus, after the noise stops the line returns to its commanded state and the noise mitigation logic can thus detect the match or absence of collision. Basically, noise changes the state of one or more of the lines when it appears and when it disappears, and both changes can be detected by the noise mitigation logic while monitoring the respective input buffer.

Figure 14:
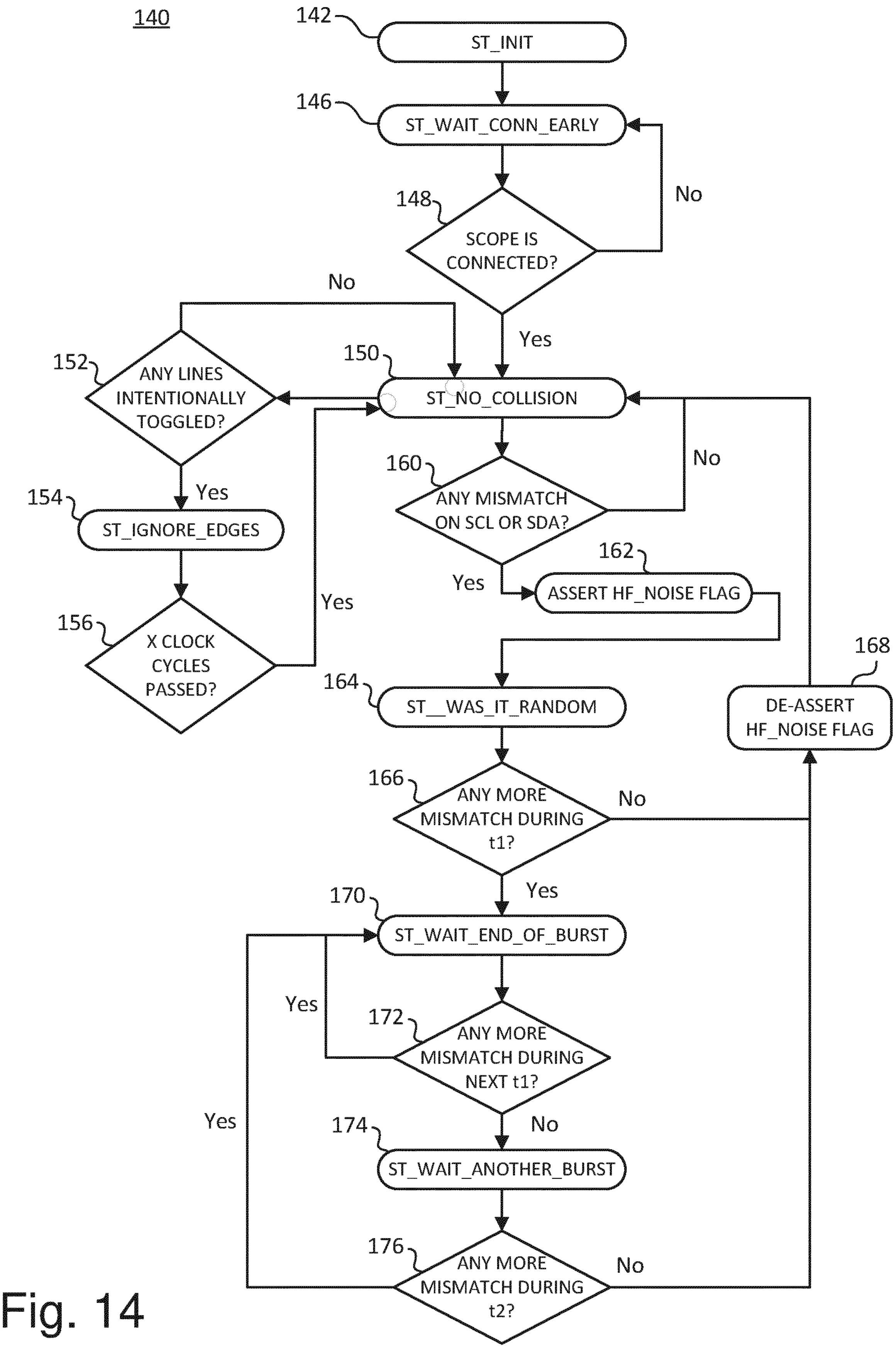
FIG. 14 shows a flow chart of another embodiment of the noise detection method in accordance with the present disclosure.

Referring now to FIG. 14, another embodiment of a method of mitigating the effect of high frequency noise will be described with reference to a flow chart 140. Before the method is implemented, at 142 the VPA 18 verifies that the endoscope is connected. At 146, the noise mitigation logic 51 on the FPGA 52 waits for confirmation that the endoscope 2 is connected. At 148, the noise mitigation logic 51 queries whether the connection is made, for example by receiving an indication of a state-change of a wire, as is known in the art. If the endoscope is not connected, the noise mitigation logic 51 returns to 146 and then periodically checks again until the scope is connected. The foregoing are preferable but it is also possible to detect and mitigate noise by monitoring the buffers without checking that the endoscope has been connected.

At 150, the noise mitigation logic 51 begins to check whether there is a collision, by first determining, at 152, whether any lines in the communications bus were intentionally toggled. In one example, these lines include the SCL or SDA lines, corresponding to the clock and data lines. The communications bus in this embodiment comprises a configuration bus, which is used to transmit commands to the image sensor. A separate image data bus, having a faster data transfer rate, is provided to allow the image sensor to transmit the images to the VPA 18. It has been found experientially that while noise is observed on the configuration bus, the same noise source does not appear to generate noise on the image data bus.

At 154, the noise mitigation logic 51 ignores a collision that may be the result of such toggling, by ignoring the edges of the transitions caused by toggling the lines of the configuration bus, by for example waiting X clock cycles, at 156. In one example, X equals 4 cycles. The number of cycles is not entirely arbitrary, it is a number sufficiently high to prevent false positives but short enough to quickly detect noise. More or less cycles can be sufficient, depending on the clock rate and hardware used, to ensure that the edges of the toggle transition are not considered when evaluating whether a collision occurred.

After the X clock cycles passed, the noise mitigation logic 51 compares, at 160, the state of the configuration bus lines (input state) to the state previously commanded (output state). If the states match, i.e. are the same, then there has not been a collision. If, on the other hand, the states do not match, at 162, the noise mitigation logic 51 asserts the high frequency noise flag. Asserting the high frequency noise flag can simply mean that the logic state of a register is toggled from de-asserted to asserted. Of course the state of a flag can be tracked and changed in any manner known in the art. In one example, the FPGA has a pad for each line of the configuration bus (e.g. SCL and SDA). The pad is connected to an input buffer and an output buffer of the FPGA. The noise mitigation logic 51 "remembers" the last state the output buffer was set to and reads the input buffer, then compares the two states and determines whether a collision occurred based on the comparison. The natural state of the lines can be a high impedance high state.

After determining that a collision occurred, the noise mitigation logic 51 determines whether the collision was random, at 164. To do so, the noise mitigation logic 51 performs the comparison again, at 166, during a period of time t1. If the comparison does not indicate another collision occurred, the mismatch was random and the noise mitigation logic 51 de-asserts the high frequency noise flag, at 168. If the comparison indicates another collision occurred, the noise mitigation logic 51 determines that the collision was not random and a burst of high frequency voltages is underway and waits for the end of the burst, at 170. It does so by periodically comparing the input and output buffers, at 172, during periods t1, until the comparison indicates no collision.

The time t1 is set in relation to the pulse rate in the high frequency mode of the electrosurgical tool. The burst period is between 12-15 milliseconds, therefore t1 was chosen to be between 5-10% of the burst period, which provides an adequate balance between responsiveness and computational cost.

At 174, the noise mitigation logic 51 waits for another burst during a time period t2, at 176. If another burst is detected (by again performing the comparison), the noise mitigation logic 51 returns to 170 to hunt for the end of the burst. If another burst is not detected, the noise mitigation logic 51 de-asserts the high frequency noise flag, at 168.

When the high frequency noise flag is asserted, the noise mitigation logic 51 pauses configuration of the image sensor to prevent that the configuration data, transmitted over the configuration bus, becomes corrupted by the noise and thus causes a malfunction of the camera module. The camera module continues to transmit the image data, over the image data bus, based on the last set of configuration data received by the image sensor. When the high frequency noise flag is de-asserted, the noise mitigation logic 51 again sends the configuration data to the image sensor. The configuration data may comprise, for example, automatic exposure settings (AES) to control, substantially on an image by image basis, the exposure setting of the image sensor. While transmission of the configuration data is paused, the image sensor does not receive configuration data, such AES commands, but continues generating images using the last transmitted AES command.

A collision can occur in different ways. If the detector circuit 60 is provided in the endoscope 2, the detector circuit 60 can bring down the output signal and thus bring down the SCL or the SDA lines. By forcing a state change on either line, the detector circuit causes a change at the input buffer which results in the determination that a collision occurred.

The noise caused by the electrosurgical tool 25 can also change the state of the configuration bus. The change of state, which is not a command from the VPA 18, causes the change at the input buffer which results in the determination that a collision occurred.

The noise mitigation logic 51 can pause configuration of the image sensor in different ways. First, the noise mitigation logic 51 can simply stop transmitting commands over the configuration bus. Second, the noise mitigation logic 51, as the configuration bus master, can transmit a stop command over the configuration bus. The stop command provides a graceful way to command the image sensor to stop reading the configuration bus and, thus, to prevent problems when noise appears mid-transmission, when a packet has been at least partly transmitted. Third, the noise mitigation logic 51, as the configuration bus master, can set the state of the lines to end a transmission and prevent subsequent packets from being transmitted. One or more of these options may be implemented, based on the configuration bus protocol and, potentially, on the timing of an in-progress transmission.

Figure 15:
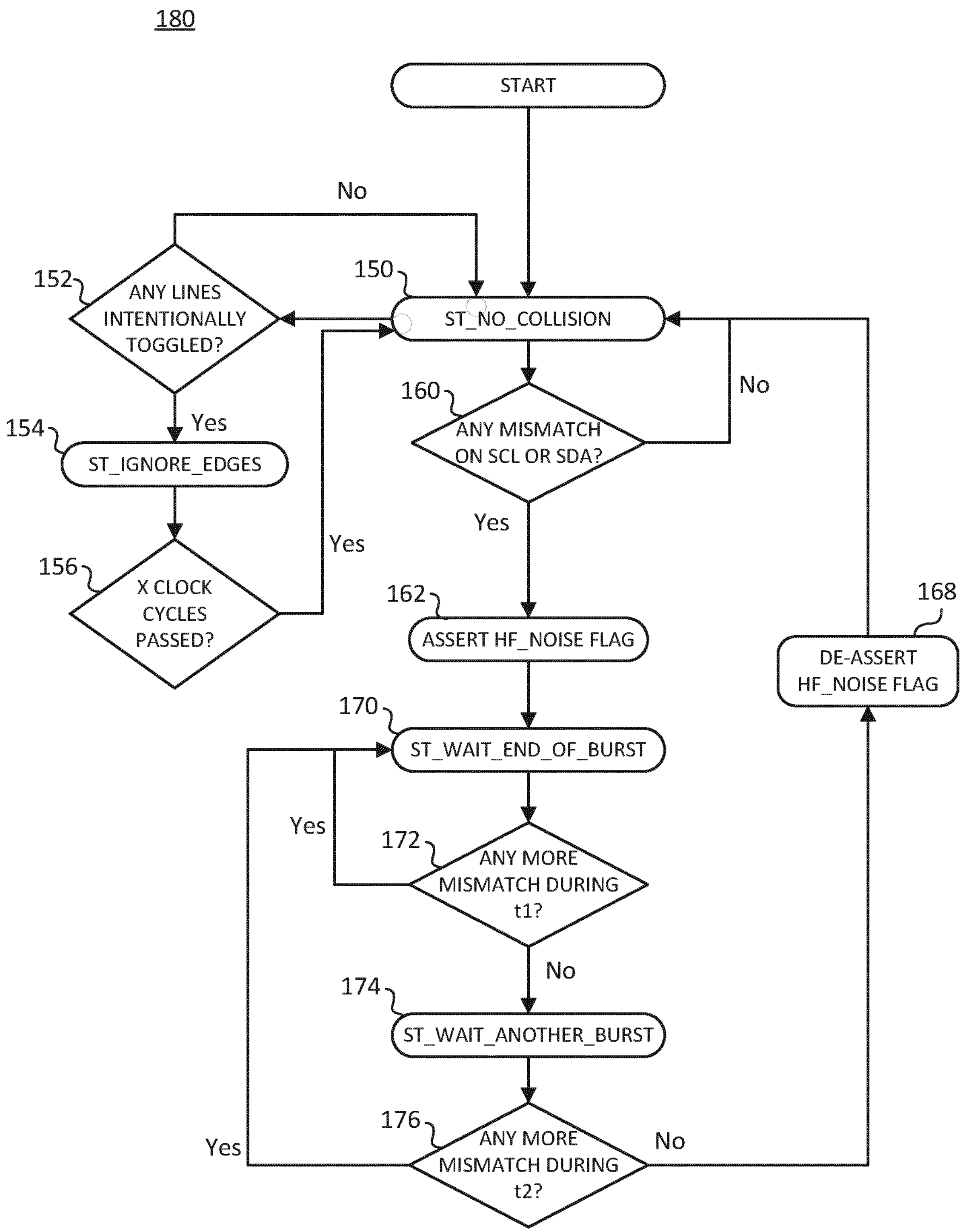
FIG. 15 shows a variation of the embodiment of the noise detection method of FIG. 14.

FIG. 15 depicts a flow chart 180 that illustrates a simpler embodiment of the method of mitigating the effect of high frequency noise described with reference to FIG. 14. In the present embodiment, the method does not test for random collisions/mismatches. If the high frequency noise flag is asserted, the method hunts for the end of the burst and then checks during the period t2 before de-asserting the high frequency noise flag.

Additional exemplary embodiments of the foregoing aspects of the present disclosure are set out in the following exemplary items:

1. System comprising: a display unit (18); the display unit (18) comprising an input circuitry (50) configured to communicate with the handle or interface printed circuit board (40) and with the image sensor circuitry (42) via the communication bus (48); and the communication bus (48) connecting the endoscope (2) and the display unit (18) and configured to enable a communication between the image sensor circuitry (42), the handle or interface printed circuit board (40) and the input circuitry (50); wherein the input circuitry (50) of the display unit (18) is configured to, preferably continuously or pulsatively, check for a high frequency noise and electrical disturbance on the communication bus (48).
2. System according to item 1, wherein the input circuitry (50) is configured to terminate a communication via the communication bus (48) in case of a high frequency noise and electrical disturbance on the communication bus (48).
3. System according to item 1 or 2, wherein the communication between the input circuitry (50), the handle or interface printed circuit board (40) and the image sensor circuitry (42) is based on master-slave, wherein the input circuitry (50) is the master and the handle or interface printed circuit board (40) and the image sensor circuitry (42) are slaves.

4. System according to item 3, wherein the input circuitry (50) is configured to initially set a communication line output signal of a communication line of the communication bus (48), and to compare the communication line output signal with a communication line input signal of the communication line received from the handle or interface printed circuit board (40), to determine a presence of the high frequency noise and electrical disturbance on the communication bus (48).

5. System according to item 4, wherein the communication line output signal is an output clock signal of a clock line of the communication bus (48) and the communication line input signal is an input clock signal of the clock line of the communication bus (48), and the input circuitry (50) is configured to initially set the output clock signal, and to compare the output clock signal with the input clock signal received from the handle or interface printed circuit board (40), to determine the presence of the high frequency noise and electrical disturbance on the communication bus (48).

6. System according to item 4 or 5, wherein the input circuitry (50) is configured to generate a comparison signal based on a comparison of the communication line output signal and the communication line input signal, and to determine the presence of the high frequency noise and electrical disturbance in case the comparison signal exceeds a predetermined threshold.

7. System according to any one of items 1 to 3, wherein the endoscope (2) further comprises a working channel (22) configured for insertion of an electrosurgical tool (25) into a patient's body cavity; and a detector circuit (60) configured to detect the high frequency noise and electrical disturbance, arising from a use and an operation of the electrosurgical tool (25) and affecting the communication bus (48), in the working channel (22).

8. System according to item 7, wherein the detector circuit (60) is configured to provide an output signal indicating a presence of the high frequency noise and electrical disturbance on the communication bus (48).

9. System according to any one of the preceding items 1 to 8, wherein the input circuitry (50) is configured to:

a) determine whether a noise detection signal is received; and b) block the communication bus (48) in case the noise detection signal is received.

10. System according to item 9, wherein the input circuitry (50) is further configured to:

c) look for a further noise detection signal for a first predetermined time period;

d) in case no further noise detection signal is received in step c), restart an operation of the communication bus (48); and e) in case a further noise detection signal is received in step c), wait until no noise detection signal is received for the first predetermined time period, i.e. until an end of a burst of pulses (130) emitted by an electrosurgical tool (25) is reached.

11. System according to item 10, wherein the input circuitry (50) is further configured to:

f) at the end of the burst of pulses (130), wait for a second predetermined time period and determine whether there is a further burst of pulses (130) detected during the second predetermined time period;

g) in case no further burst of pulses (130) is detected in step f), restart the operation of the communication bus (48); and h) in case a further burst of pulses (130) is detected in step f), repeat step e) until no further burst of pulses (130) is detected in step f).

12. System according to any one of the preceding items 1 to 11, further comprising an electrosurgical tool (25) configured to be inserted into a working channel (22) of the endoscope (2) and emitting an electrical high frequency noise signal comprising a burst of pulses (130) with a wide range of frequencies during operation.

13. Display unit (18) comprising an input circuitry (50) configured to, preferably continuously or pulsatively, check for a high frequency noise and electrical disturbance on a communication bus (48), via which the display unit (18) is connectable to an endoscope (2) and which enables a communication between the input circuitry (50) and the endoscope (2).

14. Display unit (18) according to item 13, wherein the input circuitry (50) is configured to terminate the communication via the communication bus (48) in case of a high frequency noise and electrical disturbance on the communication bus (48).

15. Method of, preferably continuously or pulsatively, checking for a high frequency noise and electrical disturbance on a communication bus (48), via which a display unit (18) is connectable to an endoscope (2) and which enables a communication between the display unit (18) and the endoscope (2), and preferably of terminating the communication via the communication bus (48) in case of a high frequency noise and electrical disturbance on the communication bus (48).

16. Endoscope (2) comprising a proximal endoscope handle or interface (4) comprising a handle or interface housing (38), a working channel access port (24) and a printed circuit board (40), wherein the printed circuit board (40) is accommodated inside the handle or interface housing (38); an insertion cord (6) extending from the proximal endoscope handle or interface (4) and comprising an insertion tube (8), a bending section (10) and a distal tip unit (12), wherein the distal tip unit (12) comprises a camera module (13) connected with the printed circuit board (40); a working channel (22) extending from the working channel access port (24) of the endoscope handle or interface (4) to the distal tip unit (12) of the insertion cord (6); and a detector circuit (60) configured to detect a presence of a high frequency noise and electrical disturbance arising from a use and an operation of an electrosurgical tool (25) in the working channel (22).

17. Endoscope (2) according to item 16, wherein the detector circuit (60) comprises: a sensor part (62) configured to detect the presence of the high frequency noise and electrical disturbance, and a circuit part (64) electrically connected with the sensor part (62) and configured to provide an output signal indicating the presence of the high frequency noise and electrical disturbance.

18. Endoscope (2) according to item 17, wherein the sensor part (62) is configured to input a voltage to the circuit part (64), and the circuit part (64) is configured to output the output signal based on the voltage input to the circuit part (64) from the sensor part (62).

19. Endoscope (2) according to item 18, wherein the circuit part (64) is configured to set an upper threshold voltage (96, U1) and a lower threshold voltage (92, U2), and the output signal of the circuit part is changed when the voltage transmitted from the sensor part (62) is above the upper threshold voltage (96, U1) or below the lower threshold voltage (92, U2).

20. Endoscope (2) according to any one of items 17 to 19, wherein the circuit part (64) is integrated in the printed circuit board (40) provided in the endoscope handle or interface (4).
21. Endoscope (2) according to any one of items 17 to 20, wherein the circuit part (64) comprises a window comparator (84, 124, 126).
22. Endoscope (2) according to any one of items 17 to 21, wherein the sensor part (62) is positioned around the working channel (22) so as to at least partly surround the working channel (22).
23. Endoscope (2) according to any one of items 17 to 22, wherein the working channel (22) is formed by a connector part (76) comprising the access port (24), by a working channel tube (65) and by a tip housing of the distal tip unit (12), and the sensor part (62) is positioned on an outer surface of the connector part (76) or on an outer surface of the working channel tube (65).
24. Endoscope (2) according to any one of items 17 to 23, wherein the sensor part (62) is an electrically conductive part and is configured so as to function as a capacitor (84).
25. Endoscope (2) according to any one of items 17 to 24, wherein the sensor part (62) is formed as an electrically conductive foil or tape or as a flexible printed circuit board, so as to be able to be bent and shaped in order to follow an outer contour of the working channel (22).
26. Endoscope (2) according to any one of items 17 to 22, wherein the sensor part (62) is arranged inside the proximal endoscope handle or interface (4).
27. System comprising: an endoscope (2) according to any one of the preceding items 16 to 26; and a display unit (18) being connected with the printed circuit board (40) accommodated in the handle or interface housing (38) of the endoscope handle or interface (4), being configured to communicate with the camera module (13) provided in the distal tip unit (12) of the insertion cord (6) via a communication bus (48), and being configured to terminate a communication via the communication bus (48) when the detector circuit (60) detects the presence of the high frequency noise and electrical disturbance.
28. System according to item 27, wherein the display unit (18) comprises an input circuitry (50) comprising a logic circuitry for communicating with the printed circuit board (40) accommodated in the handle or interface housing (38) of the endoscope handle or interface (4) and with the camera module (13) provided in the distal tip unit (12) of the endoscope (2), the input circuitry (50) being configured to indirectly or directly receive an output signal from the detector circuit (60).
29. System according to item 27 or 28, further comprising: an electrosurgical tool (25) configured to be operated by high voltage pulses generating a high frequency noise and electrical disturbance during operation.
30. System according to item 29, wherein the electrosurgical tool (25) is provided to be inserted into the working channel (22) of the endoscope (2), the high voltage pulses result in an electrical field, and the electrical field charges a sensor part (62) of the detector circuit (60) when the electrosurgical tool (25) is accommodated and operated inside the working channel (22).

The terms "comprise(s)," "include(s)," "having," "has," "can," "contain(s)," and variants thereof, as used herein, are intended to be open-ended transitional terms that do not preclude the possibility of additional acts or structures. By contrast, the term "consists," as used herein, is intended to be a closed-ended transitional term that precludes the possibility of additional acts or structures.

LIST OF REFERENCE SIGNS

2 endoscope
4 endoscope handle
6 insertion cord
8 insertion tube
10 bending section
12 distal tip unit
13 camera module
14 image sensor
16 monitor/screen
18 display unit
19 image processing device
20 plug and socket connection
22 working channel
24 access port
25 electrosurgical tool
26 first operating unit
28 second operating unit
30 cover
31 steering wire
32 gas/water injection valve
34 suction valve
36 top surface
38 handle housing
40 handle printed circuit board
42 image sensor circuitry
44 electrical wires
46 electrical wires
48 communication bus
50 input circuit board
51 noise mitigation logic
52 FPGA
56 working channel orifice
58 cable
60 detector circuit
62 sensor part
64 circuit part
65 working channel tube
66 waterjet tube
68 rinsing tube
70 insufflation tube
72 first cable conduit
73 first inlet channel
74 second inlet channel
75 outlet channel
76 Y-connector
78 cable
80 second cable conduit
84 capacitor
86 IC chip
90 input voltage
92 lower threshold voltage
94 output voltage
96 upper threshold voltage
98 capacitor
100 zener diode
102 resistor
104 zener diode

106 zener diode
108 resistor
110 capacitor
112 resistor
114 resistor
116 resistor
118 resistor
120 resistor
122 pull-up resistor
124 first op-amp
126 second op-amp
130 burst of pulses

The invention claimed is:

1. A visualization system comprising:
an endoscope including:
a working channel configured to receive an electrosurgical tool;
a communication bus;
an image sensor; and
a detector circuit comprising
(i) a sensor part configured to detect a presence of a high frequency noise and electrical disturbance arising from operation of the electrosurgical tool, and
(ii) a circuit part electrically connected with the sensor part and configured to provide a noise detection signal via the communication bus responsive to the sensor part detecting the presence of the high frequency noise and electrical disturbance on the communication bus; and
a video processing apparatus including an input circuitry and a noise mitigation logic, the input circuitry adapted to communicate with the endoscope,
wherein the circuit part is configured to set an upper threshold voltage and a lower threshold voltage and to provide the noise detection signal when a voltage transmitted from the sensor part is above the upper threshold voltage or below the lower threshold voltage, and
wherein the noise mitigation logic is configured to, responsive to the noise detection signal, cease transmission of configuration data to the image sensor via the communication bus.

2. The visualization system of claim 1, wherein the configuration data comprises at least one configuration parameter of the image sensor, wherein the video processing apparatus is configured to receive images generated by the image sensor and to continue receiving the images while transmission of the configuration data to the image sensor is ceased.

3. The visualization system of claim 2, wherein the noise mitigation logic is configured to periodically check for the high frequency noise and electrical disturbance on the communication bus.

4. The visualization system of claim 1, wherein the input circuitry is configured to set a communication line output signal of a communication line of the communication bus, and to compare the communication line output signal with a communication line input signal, of the communication line, received from the endoscope, to determine the presence of the high frequency noise and electrical disturbance on the communication bus.

5. The visualization system of claim 4, wherein the communication line output signal is an output clock signal of a clock line of the communication bus and the communication line input signal is an input clock signal of the clock line of the communication bus, and the input circuitry is configured to initially set the output clock signal, and to compare the output clock signal with the input clock signal received from the endoscope, to determine the presence of the high frequency noise and electrical disturbance on the communication bus.

6. The visualization system of claim 4, wherein the input circuitry is configured to generate a comparison signal based on a comparison of the communication line output signal and the communication line input signal, and to determine the presence of the high frequency noise and electrical disturbance in case the comparison signal exceeds a predetermined threshold.

7. The visualization system of claim 1, wherein the endoscope further comprises:
a handle or interface comprising a housing, a working channel access port and a printed circuit board positioned inside the housing;
an insertion cord extending from the housing and comprising an insertion tube, a bending section and a distal tip unit, the distal tip unit comprising a camera module connected with the printed circuit board and comprising the image sensor; and
the working channel extending from the working channel access port to the distal tip unit of the insertion cord.

8. The visualization system of claim 7, wherein the circuit part is integrated in the printed circuit board provided in the housing.

9. The visualization system of claim 1, wherein the circuit part comprises a window comparator.

10. The visualization system of claim 1, wherein the sensor part at least partly surrounds the working channel.

11. The visualization system of claim 1, wherein the circuit part is configured to provide the noise detection signal via the communication bus by outputting a trigger signal that causes a line of the communication bus to be pulled down, wherein the line being pulled down comprises the noise detection signal.

12. The visualization system of claim 11, wherein the line being pulled down is a clock line.

13. The visualization system of claim 1, wherein the circuit part is configured to provide the noise detection signal via the communication bus by transmitting a signal on the communication bus.

14. A visualization system comprising:
an endoscope including:
a working channel configured to receive an electrosurgical tool;
a communication bus;
an image sensor; and
a detector circuit comprising
(i) a sensor part configured to detect a presence of a high frequency noise and electrical disturbance arising from operation of the electrosurgical tool, and
(ii) a circuit part electrically connected with the sensor part and configured to provide a noise detection signal via the communication bus responsive to the sensor part detecting the presence of the high frequency noise and electrical disturbance on the communication bus; and
a video processing apparatus including:
an input circuitry adapted to communicate with the endoscope; and
a noise mitigation logic configured to:
a) determine whether the noise detection signal is received; and b) block the communication bus and cease transmission of configuration data to the image sensor via the communication bus in case the noise detection signal is received, c) check for a further noise detection signal for a first predetermined time period;

d) in case no further noise detection signal is received at c), restart an operation of the communication bus; and e) in case the further noise detection signal is received at c), wait until no noise detection signal is received for the first predetermined time period, which indicates that an end of a burst of pulses emitted by the electrosurgical tool has been reached.

15. The visualization system of claim 14, wherein the noise mitigation logic is further configured to:

f) at the end of the burst of pulses at e), wait for a second predetermined time period and determine whether there is a further burst of pulses detected during the second predetermined time period;

g) in case no further burst of pulses is detected at f), restart the operation of the communication bus; and h) in case a further burst of pulses is detected at f), repeat e) until no further burst of pulses is detected at step f).

16. The visualization system of claim 15, wherein the second predetermined time period is between 100 and 200 milliseconds.

17. The visualization system of claim 14, wherein the first predetermined time period is between 1 and 10 milliseconds.

18. The visualization system of claim 14, wherein the first predetermined time period is 1 millisecond.

19. The visualization system of claim 14, wherein the first predetermined time period is greater than a time between two sequential clock pulses on a clock line of the communication bus.

* * * * *